INVENTOR.
Glenn T. McClure
BY George K. Newell
Adelbert A. Steinmiller
Attorney

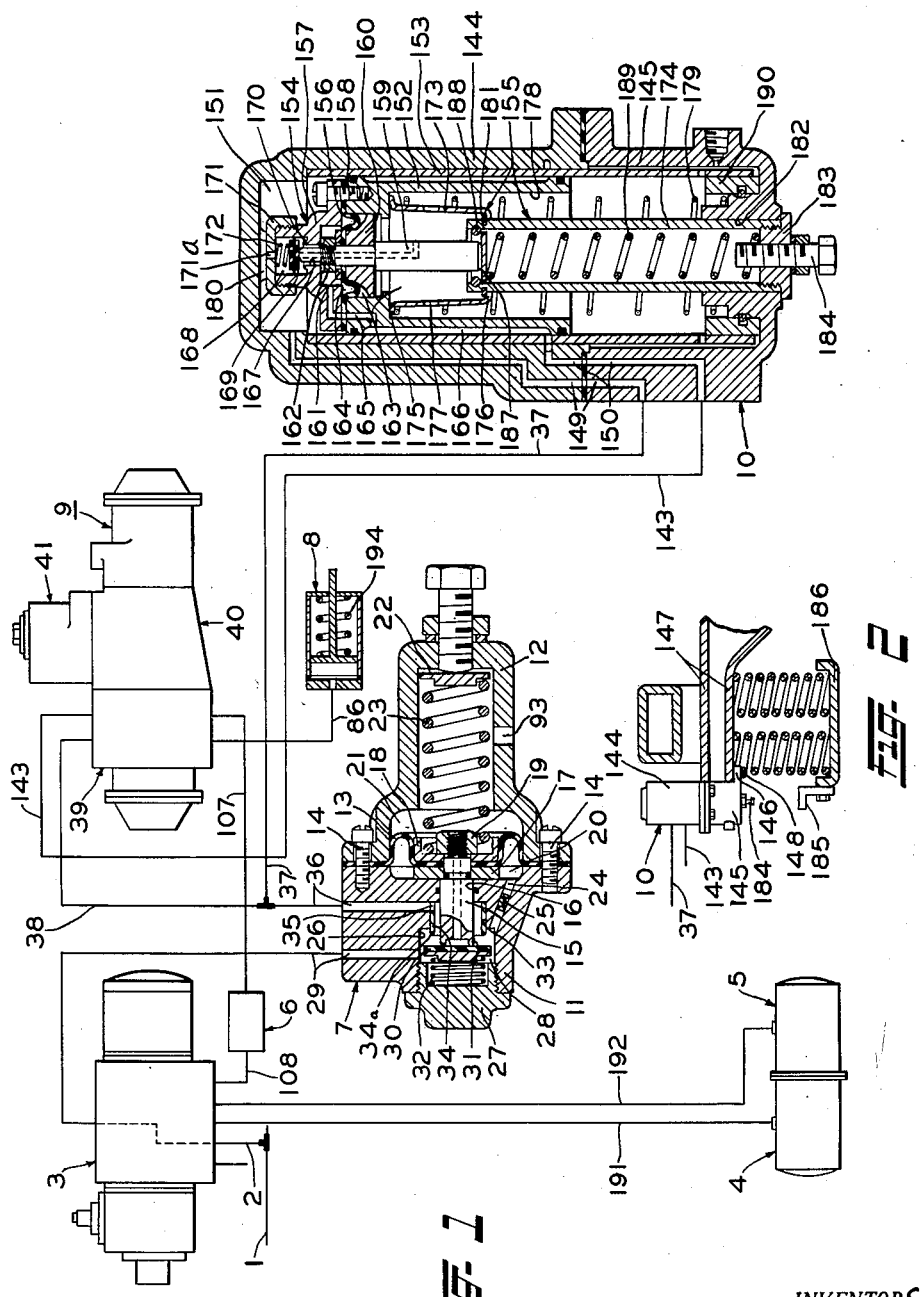

May 30, 1961 G. T. McCLURE ET AL 2,986,427
VARIABLE LOAD BRAKE CONTROL APPARATUS FOR RAILWAY CARS
Filed Jan. 28, 1959 4 Sheets-Sheet 3

INVENTOR.
Glenn T. McClure
BY George K. Newell
Adelbert A. Steinmiller
Attorney

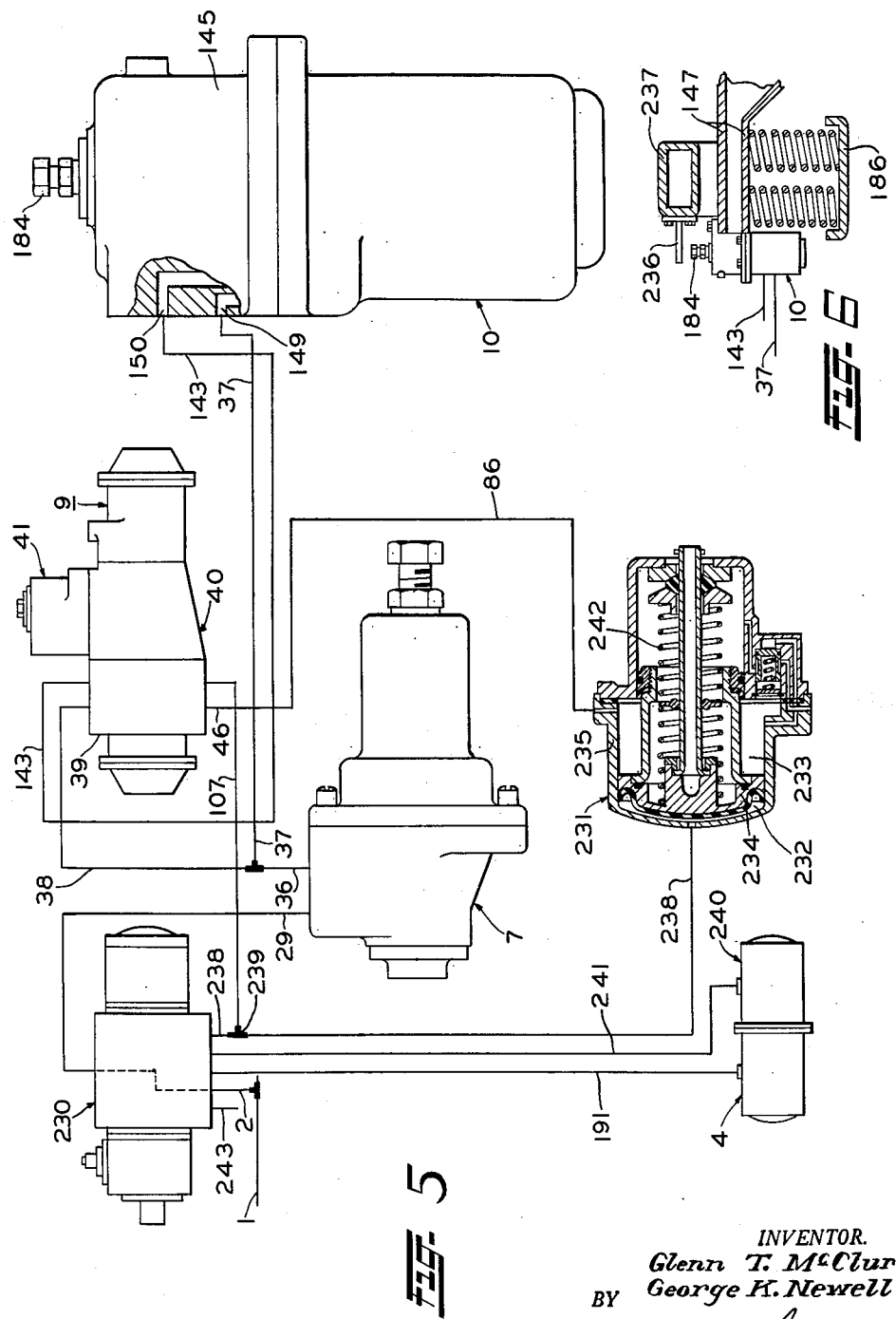

United States Patent Office 2,986,427
Patented May 30, 1961

2,986,427

VARIABLE LOAD BRAKE CONTROL APPARATUS FOR RAILWAY CARS

Glenn T. McClure, McKeesport, and George K. Newell, Trafford, Pa., assignors to Westinghouse Air Brake Company, Wilmerding, Pa., a corporation of Pennsylvania Filed Jan. 28, 1959, Ser. No. 789,545

20 Claims. (Cl. 303—22)

This invention relates to fluid pressure brake apparatus for railway vehicles and more particularly to such fluid pressure brake apparatus embodying means for automatically adjusting the degree of a brake application in accordance with the load carried on the vehicle.

The present trend towards the use of lightweight materials in the construction of railway cars has resulted in much higher ratios of gross weight to tare weight than ever before encountered. Since the braking force in relation to the weight of an empty car must be such as to avoid wheel sliding and excessive train shock, the braking force on lighter weight cars will consequently have to be lower than heretofore. Because the gross weight is limited only by the load limit for the truck, which remains unchanged, the lower braking force will be inadequate for proper braking control of such cars when loaded.

The variable load brake equipments heretofore proposed for railway freight cars having conventional metallic coiled springs have been considered excessively expensive by the railway companies and for this reason have not enjoyed widespread commercial success.

Some of the railway passenger cars being built today are equipped with air springs rather than the conventional metallic coiled springs heretofore used.

It is accordingly the principal object of the present invention to provide a small, inexpensive, lightweight, compact, variable load brake equipment having certain components thereof adaptable for use on either railway freight cars having conventional metallic coiled springs or railway passenger cars having conventional metallic coiled springs or air springs.

This invention comprises a novel variable load brake equipment for a railway vehicle embodying a novel load compensating valve unit which controls the supply of fluid under pressure to the brake cylinder, said valve unit having a variable ratio fluid pressure operated self-lapping valve device and a fluid pressure operated adjusting mechanism for adjusting the ratio of the valve device according to the load on a railway vehicle. The ratio characteristic of the load compensating valve unit is varied according to the pressure of fluid supplied to the adjusting mechanism thereof and controlled according to the load on the vehicle by a novel strut cylinder load measuring mechanism or by a leveling valve device which also controls the pressure of fluid in the air springs of a railway vehicle so equipped. The load compensating valve device may be operated in conjunction with an automatic brake system by fluid under pressure supplied in response to automatic operation of a control valve device of either the graduated or direct release type, or in conjunction with a straight air brake system by fluid under pressure supplied in response to manual operation of a straight air brake valve device.

In the accompanying drawings:

Fig. 1 is a diagrammatic view, partly in section, showing a railway freight car brake equipment which includes a novel load compensating valve device and a novel load measuring apparatus associated with a graduated release type of control valve device and a conventional type of brake cylinder device.

Fig. 2 is a fragmentary vertical sectional view showing the manner by which a strut cylinder forming part of the apparatus of Fig. 1 is mounted on a sprung part of a railway freight car, such as a bolster, and the relation of the strut cylinder to a stop member carried on an unsprung part of the car, such as a truck spring plank of the side frame of a car trunk.

Fig. 5 is a diagrammatic view, partly in section, showing a railway freight car brake equipment which includes a modified arrangement of the novel load compensating valve device and load measuring apparatus shown in Fig. 1, with a direct release type of control valve, such as the well-known "AB" valve device, and a compensating type of brake cylinder device.

Fig. 6 is a fragmentary vertical sectional view showing the manner by which a strut cylinder forming part of the apparatus of Fig. 5 is mounted on a car bolster and the relation of the strut cylinder to a stop member carried on a truck side frame.

DESCRIPTION—FIGS. 1 TO 3

Figure 3:
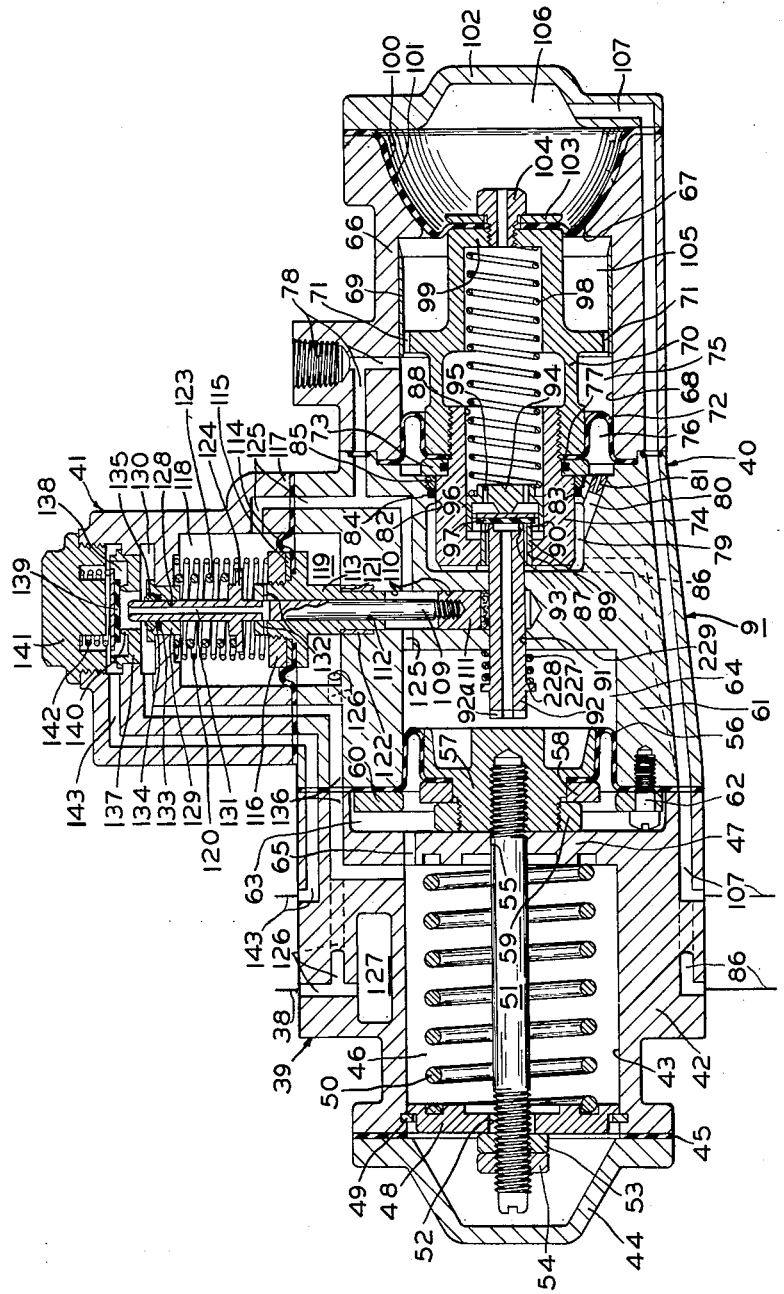
Fig. 3 is a vertical cross-sectional view, at an enlarged scale, of the load compensating valve device of Fig. 1 showing the structural details of this valve device.

In Fig. 1 the fluid pressure brake equipment shown comprises a brake pipe 1, a branch pipe 2, a brake control valve device 3, an auxiliary reservoir 4, a control reservoir 5, a pressure limiting valve device 6, a cut-off valve device 7, a brake cylinder device 8, which may be of the standard type, a load compensating valve device 9, and a load measuring mechanism 10.

The brake control valve device 3 may be of the graduated release type, such as that disclosed in United States patent application, Serial No. 683,661 of Richard L. Wilson and William B. Jeffrey, filed September 12, 1957 and assigned to the assignee of the present application, and in view of this it is deemed unnecessary to show and describe this device in detail. It will, of course, be understood that this device operates upon a service reduction in brake pipe pressure to supply fluid under pressure to effect a service application of the brakes, upon an emergency reduction in brake pipe pressure to effect an emergency application of the brakes, and upon an increase in brake pipe pressure to effect a release of the brakes, in accordance with the degree to which the brake pipe pressure is restored, as well as the recharging of the brake equipment.

The limiting valve device 6 may be of any suitable construction that will provide for limiting the maximum pressure that can be supplied by the brake control valve device 3 to the load compensating valve device 9 and thereby the maximum pressure that may be established in brake cylinder 8, so as to prevent excessive braking when a car is empty.

The load compensating valve device 9 embodies a self-lapping valve mechanism, hereinafter described, which is operated by the fluid under pressure supplied through the limiting valve 6 to effect the supply of fluid under pressure to the brake cylinder 8 to a degree proportional to this control pressure and to the load on the car as will hereinafter be more fully explained.

The cut-off valve device 7 is provided for the purpose of controlling the supply of fluid under pressure from the brake pipe 1 to the load compensating valve device 9 for the operation of a locking mechanism hereinafter described and to the load measuring mechanism 10 for operation of this measuring mechanism so as to cut off the supply of fluid under pressure to these devices when the brake pipe is charged from atmospheric pressure to a predetermined degree of pressure, such as thirty-five pounds per square inch, and to maintain this supply cut off until the brake pipe pressure is reduced to this predetermined pressure.

The cut-off valve device 7 may comprise a casing 11 and a cover 12 between which is clamped the outer periphery of a diaphragm 13. The casing 11 and cover 12 are secured together by any suitable means such as several cap screws 14. The right-hand end of a hollow plunger 15 slidably mounted in a bore 16 in the casing 11 is operably connected to the center of the diaphragm 13 by means such as a pair of diaphragm followers 17 and 18 disposed on opposite sides of the diaphragm 13 and a nut 19 having screw-threaded engagement with the right-hand end of the hollow plunger 15.

The diaphragm 13 cooperates with the casing 11 and cover 12 to form within the cut-off valve 7 and on opposite sides of the diaphragm, two chambers 20 and 21. Disposed within the chamber 21 between the diaphragm follower 18 and an adjustable spring seat 22 is a spring 23 for biasing the hollow plunger 15 to the position in which it is shown in Fig. 1 in which position the diaphragm follower 17 is in abutting contact with the casing 11.

The chamber 20 on the left-hand side of diaphragm 13 is connected by a passage 24 and a choke 25 therein to a first counterbore 26 formed in the casing 11 and coaxial with the bore 16. The open end of the counterbore 26 is threaded to receive a screw plug 27 which cooperates with the walls of the counterbore to form a chamber 28 into which the left-hand end of the plunger 15 extends. The chamber 28 is in constant open communication by way of a pipe and passage 29, a brake pipe passage (not shown) provided in the brake control valve device 3, and branch pipe 2 to the brake pipe 1.

Disposed within the chamber 28 is a flat disc-type valve 30 which is biased in the direction of an annular exhaust valve seat 31, formed on the left-hand end of the plunger 15, by a spring 32 interposed between the valve 30 and the plug 27.

The casing 11 is provided with a second counterbore 33 coaxial with the bore 16 and connecting said bore to the first-mentioned counterbore 26 which has a larger diameter than the counterbore 33. Press-fitted into the second counterbore 33 is a tubular supply valve seat member 34 coaxial with and arranged in a spaced-apart surrounding relationship to the hollow plunger 15. The right-hand end of the tubular valve seat member 34 is provided with a port 35 for establishing a communication between the interior of the valve seat member 34 and a passage and pipe 36 which has a first branch 37 connected to the load measuring mechanism 10 and a second branch 38 connected to the load compensating valve device 9. The left-hand end of the tubular valve seat member 34 extends into the chamber 28 so as to operatively contact the disc valve 30 to close communication between the chamber 28 and pipe and passage 36 upon brake pipe pressure increasing to the hereinbefore-mentioned predetermined pressure.

The load compensating valve device 9 comprises (Fig. 3) a pipe bracket portion 39 to which all pipe connections are made, a self-lapping valve mechanism 40 secured to the pipe bracket portion 39 by any suitable means (not shown), and a locking portion 41 secured to the self-lapping valve mechanism 40 by any suitable means (not shown).

The pipe bracket portion 39 comprises a casing section 42 having a counterbore 43 the open end of which is closed by a cover 44 and a gasket 45 to form a pressure chamber 46. Disposed between a wall 47 at the right-hand end of the counterbore 43 and a spring seat 48, retained in the left-hand end of the counterbore by a snap ring 49, is a regulating spring 50. The spring seat 48 is operatively connected to the left-hand threaded end of a rod 51 which extends through a central bore 52 in the spring seat by a nut 53 and a lock nut 54.

The rod 51 extends through the spring 50 and a bore 55 in the wall 47 where the right-hand threaded end is operatively connected to the center of a movable abutment in the form of diaphragm 56 by means such as a pair of diaphragm followers 57 and 58 and a nut 59 having screw-threaded engagement with the diaphragm follower 57. The outer periphery of the diaphragm 56 is clamped between an annular ring 60 and a casing 61 which constitutes a part of the self-lapping valve mechanism 40 hereinafter described in detail. The annular ring 60 is secured to the casing 61 by any suitable means, such as several cap screws 62, only one of which is shown in Fig. 3.

The casing 61 of the self-lapping valve mechanism 40 is secured to the casing 42 of the pipe bracket portion 39 by any suitable means (not shown) so that the diaphragm 56 cooperates with the casings 42 and 61 to form, on opposite sides of the diaphragm two chambers 63 and 64. The chamber 63 is connected to the chamber 46 by means of a passage 65 extending through the wall 47.

The self-lapping mechanism 40 comprises, in addition to the casing 61, a second casing 66. The casing 66 has a bore 67 extending therethrough. Coaxial with the bore 67 and extending inward from the left-hand end of the casing 66 is a counterbore 68. Press-fitted into the counterbore 68 is a bushing 69 the length of which is substantially less than the length of the counterbore 68.

Slidably mounted in the bushing 69 is a hollow movable abutment or follower member 70 the periphery of which is provided with several slots 71 only two of which are shown in Fig. 3. The purpose of these slots will be hereinafter made apparent.

The left-hand end of the movable abutment 70 is operatively connected to the center of a diaphragm 72 by means such as a diaphragm follower 73 and a nut 74 having screw-threaded engagement with the movable abutment. The outer periphery of the diaphragm 72 is clamped between the two casings 61 and 66 which comprise the body of the self-lapping valve mechanism 40. These two casings are secured together by any suitable means (not shown).

The diaphragm 72 cooperates with the casings 61 and 66 to form within the self-lapping mechanism 40 and on opposite sides of the diaphragm, two chambers 75 and 76. The diaphragm follower 73 is provided with an O-ring 77 which contacts the outer periphery of a portion of the nut 74 and forms therewith a leak-proof seal between chambers 75 and 76. The chamber 75 is open to atmosphere through a passage 78 formed in casing 66 and the chamber 76 is connected to a chamber 79 in the casing 61 by a passage 80 in which is disposed a choke 81. The chamber 76 is also connected to the chamber 79 by a bore 82 in the casing 61. The outer periphery of the nut 74 is slidably mounted in the bore 82. An O-ring seal 83 is disposed in a counterbore 84 formed in the casing 61 and coaxial with the bore 82. The O-ring 83 surrounds the outer periphery of the nut 74 to form a seal therewith and is retained in the counterbore 84 by a hollow threaded plug 85 having screw-threaded engagement with a threaded portion of the counterbore 84. The O-ring 83 thus limits the supply of fluid under pressure from the chamber 79 to the chamber 76 to the capacity of the choke 81. The chamber 79 is connected by a pipe and passage 86 to the brake cylinder 8 shown in Fig. 1.

The nut 74 has a longitudinally extending bore 87 open at one end to the chamber 79 and at the opposite end to a coaxial counterbore 88 formed in the nut. Press-fitted into the bore 87 is a bushing 89 having at its end adjacent the counterbore 88 an annular supply valve seat 90.

Slidably mounted in a bore 91 in the casing 61 is a hollow sleeve member 92 the left-hand end of which is provided with several slots 92a. This end extends into the chamber 64 adjacent the diaphragm follower 57. The sleeve member 92 extends with substantial clearance through the bushing 89 and has formed at its right-hand end an annular exhaust valve seat 93.

Slidably mounted in the counterbore 88 in the nut 74 is a combined spring seat and valve guide member 94. The member 94 is provided with a pair of ports 95 and several annularly-arranged guide fingers 96. Disposed within the guide fingers 96 is a fluted flat disc valve 97 for controlling flow of fluid under pressure to and from the chamber 79 and the brake cylinder 8.

A spring 98 is interposed between the member 94 and a spring seat 99 formed on the movable abutment 70 and serves to bias the valve 97 in the direction of the seats 90 and 93 respectively.

Formed on the casing 66 adjacent the right-hand end of the bore 67 is a surface 100 in the form generally of a paraboloid. A diaphragm 101 is clamped around its peripheral edge between the right-hand end of the casing 66 and a cover 102 secured to the casing by any suitable means (not shown). The central portion of the diaphragm 101 is operatively connected to the right-hand end of the movable abutment 70 by means such as a diaphragm follower 103 and a hollow nut 104 having screw-threaded engagement with the movable abutment. An intermediate portion of the diaphragm 101 operatively contacts the paraboloid surface 100 on the casing 66, and, as the movable abutment 70 is moved in the direction of the right hand, this intermediate portion will contact less and less of this surface 100 until the intermediate portion is entirely out of contact therewith.

The diaphragm 101 cooperates with the cover 102 and casing 66 to form within the self-lapping valve mechanism 40 and on opposite sides of the diaphragm, two chambers 105 and 106. The chamber 105 is open to the atmospheric chamber 75 through the slots 71 and the chamber 106 is connected by a pipe and passage 107 to the limiting valve device 6 which in turn is connected as by a pipe 108 to a brake cylinder passage (not shown) in the brake control valve device 3. The chamber 106 is thus adapted to receive fluid under pressure from the brake control valve device 3 for applying a control force to the diaphragm 101 and against the follower member 70 which depends not only upon the pressure of such fluid but also the area of contact between the diaphragm 101 and the paraboloid surface 100. The follower member 70 being slidably mounted in the bushing 69, the area of contact between the diaphragm 101 and the paraboloid surface 100 and therefore the effective area of the diaphragm 101 may be varied according to the position of the follower member relative to the bushing, such area being greatest and the effective area of the diaphragm the least with the diaphragm follower 73 in contact with the hollow plug 85, and this area of contact being adapted to be decreased in proportion to movement of the follower member in the direction of the right-hand from the position in which it is shown in Fig. 3 to correspondingly increase the effective area of diaphragm 101.

The hollow sleeve member 92 is arranged to be held in a position to which it may be adjusted by the diaphragm 56 and follower 57 according to the load on the railway vehicle by the locking portion 41. The locking portion 41 comprises a plunger 109 slidably mounted in a bore 110 in the casing 61. The plunger 109 has at its lower end a friction shoe 111 for locking contact with the upper side of hollow sleeve member 92 to hold the sleeve member in an adjusted position. The plunger 109 extends with a sliding fit through a bore 112 in a diaphragm follower 113 which is operatively connected to the center of a diaphragm 114 of the locking portion 41 by means such as a second diaphragm follower 115 and a nut 116 having screw-threaded engagement with a threaded portion of the plunger. The outer periphery of the diaphragm 114 is clamped between the casing section 61 and a third casing section 117 comprising the body of the locking portion 41. These casing sections are secured together by any suitable means (not shown).

The diaphragm 114 cooperates with the casing sections 61 and 117 to form on opposite sides of the diaphragm, two chambers 118 and 119. Disposed within the chamber 118 on the upper side of the diaphragm 114 between the casing 117 and the nut 116 and in surrounding relation to the plunger 109 is a first spring 120 for biasing the diaphragm 114 and the diaphragm follower 113 in a downward direction to the position in which they are shown in Fig. 3, in which position a shoulder 121 formed on the diaphragm follower 113 rests against the upper end of a bushing 122 press-fitted into a counterbore formed in the casing 61 and coaxial with the bore 110 in the casing. A second spring 123, smaller in diameter than the spring 120, and disposed between the casing 117 and a collar 124 formed on the plunger 109, and in surrounding relation to the plunger, is provided for biasing the friction shoe 111 into contact with the hollow sleeve member 92. The chamber 118 is connected to the atmospheric passage 78, the interior of the bore 110 and the chamber 64 on the right-hand side of the diaphragm 56 by a passage 125 which extends through the casings 117 and 61. The chamber 119 on the lower side of the diaphragm 114 is connected by a passage 126 to a volume chamber 127 formed in the pipe bracket 39 and to the branch 38 of the pipe 36 shown in Fig. 1.

The upper end of the plunger 109 extends through a bore 128 in a bushing 129, press-fitted into the casing section 117, and into a chamber 130 formed in this casing. The chamber 130 is normally open to atmospheric chamber 118 by way of a passage 131 in the plunger 109, passageway 131 having one end opening into the chamber 130 and the other end opening through a pair of oppositely disposed ports 132 in the diaphragm follower 113 into the chamber 118 when the plunger and diaphragm follower occupy the positions in which they are shown in Fig. 3. Leakage of fluid under pressure from the chamber 130 to the chamber 118 along the periphery of the plunger 109 is prevented by an O-ring 133 disposed in a counterbore 134 in the bushing 129 and coaxial with the bore 128. The O-ring 133 is retained in the counterbore 134 by a hollow threaded nut 135 having screw-threaded engagement with a threaded portion of the counterbore.

The chamber 130 is connected by a passage 136 extending through the casing sections 117, 61 and 42 to the chamber 46. The chamber 130 is also connected by a bore formed in a valve seat member 137 and coaxial with the bore 128, to a chamber 138 also in the casing 117. Contained in chamber 138 is a disc valve member 139 which cooperates with an annular valve seat 140 formed on the valve seat member 137 surrounding the upper end of the bore therein and projecting into chamber 138. Interposed between the upper face of valve member 139 and a screw plug 141 closing the open end of chamber 138 is a spring 142 for resiliently seating the valve member on the seat 140 to normally close communication between chambers 130 and 138. The chamber 138 is connected by a pipe and passage 143 to the load measuring mechanism 10.

The load measuring mechanism 10 (Fig. 1) comprises a vertically disposed cylinder casing 144 and a non-pressure head 145 secured thereto by any suitable means (not shown). The non-pressure head 145 is provided with a flange 146 (Fig. 2) which extends laterally of a truck bolster 147 into overlapping relation with the bottom surface thereof and which is secured thereto by means such as several cap screws 148.

The cylinder casing 144 and non-pressure head 145 are provided with passages 149 and 150 (Fig. 1) to one end of which the branch pipe 37 and pipe 143 are respectively connected. The opposite end of the passage 149 opens into a chamber 151 at the upper side of a spool-type piston member 152 which is slidably mounted in a bushing 153 press-fitted into the cylinder casing 144 and extending into the non-pressure head 145. Carried by the piston member 152 are a diaphragm-operated valve mechanism 154 and a collapsible piston rod structure 155.

The diaphragm-operated valve mechanism 154 comprises a diaphragm 156 clamped around its edge between the upper end of the piston member 152 and a valve body 157 by means such as several cap screws 158. The center of the diaphragm 156 is operatively connected to a hollow rod 159 by means such as a pair of diaphragm followers 160 and 161 and a nut 162 having screw-threaded engagement with a threaded portion of the hollow rod 159.

The diaphragm 156 cooperates with the piston member 152 and the valve body 157 to form on opposite sides of the diaphragm, two chambers 163 and 164. The chamber 163 is open to atmosphere through the collapsible piston rod structure 155, the bushing 153 and the non-pressure head 145 in a manner hereinafter made apparent. The chamber 164 is connected to the passage 150 by way of a passage 165 extending through the valve body 157 and the spool-type piston member 152 and an annular chamber 166 formed between the interior wall of the bushing 153 and the outer periphery of that portion of the spool-type piston member intermediate the ends thereof which portion is of less diameter than the two opposite end portions.

The chamber 164 is connected by a bore 167, coaxial with the hollow rod 159, the upper end of which extends therethrough, to a chamber 168 formed in the valve body 157. Contained in the chamber 168 is a disc-valve member 169 which cooperates with an annular valve seat 170 formed on the valve body 157 surrounding the upper end of bore 167 and projecting into the chamber 168. Interposed between the upper face of valve member 169 and a screw-threaded cap 171 closing the open end of the chamber 168 is a spring 172 for resiliently seating valve member 169 on the seat 170 to close communication between the chambers 164 and 168. The cap 171 is provided with a port 171a to establish a constantly open communication between the chamber 168 and the chamber 151.

The collapsible piston rod structure 155 comprises a spring seat member 173 and a hollow rod 174. The spring seat member 173 is provided with an out-turned annular flange 175 at one end, an in-turned annular flange 176 at the other end and several ports 177 intermediate the flanges 175 and 176. The out-turned annular flange 175 rests against a shoulder formed by the end of a counterbore 178 in the piston member 152. Disposed within the counterbore 178 between the out-turned annular flange 175 and the non-pressure head 145 and in surrounding relation to the spring seat member 173 and hollow rod 174 is a spring 179 for biasing the piston member 152 in an upward direction to the position in which it is shown in Fig. 1 in which position the cap 171 rests against a slotted stop 180 formed on the interior of cylinder casing 144 and extending into the chamber 151.

One end of the hollow rod 174 extends through the inturned flange 176 of the spring seat member 173 and is provided with a snap ring 181 which overlies the inturned flange to provide an operative connection between the spring seat member 173 and the hollow rod 174 when the piston member 152 is moved in an upward direction by the spring 179 upon the release of fluid under pressure from the chamber 151. The opposite end of the hollow rod 174 extends through a bore 182 in the non-pressure head 145 and is provided with an internal thread to receive a plug 183 which serves to close this end of the hollow rod and to carry a cap screw 184 the head of which is adapted to be moved into contact with a stop 185 (Fig. 2) carried on an unsprung part of a railway car truck, such as a truck spring plank 186. Disposed within the hollow rod 174 between the plug 183 and a spring seat 187 retained in the opposite end thereof by a snap ring 188 is a metering spring 189 which is effective to maintain the spring seat in contact with the lower end of the hollow rod 159 and cause the hollow rod 174 to be moved downward simultaneously with the piston member 152 until the head of the cap screw 184 contacts the stop 185. The metering spring 189 is further effective, after the head of the cap screw contacts the stop 185, to be compressed to permit the piston member 152 to continue its downward movement until the lower end thereof contacts a stop 190 carried within the lower end of the bushing 153 and resting against the end of non-pressure head 145. Furthermore, the metering spring 189 is effective, after the piston member 152 contacts the stop 190, to allow the diaphragm 156 and hollow rod 159 to move downward in response to an increase in fluid pressure in the chamber 164 until the disc valve 169 is moved into contact with the valve seat 170 by the spring 172 to cut off the supply of fluid under pressure from the chambers 168 and 151 to the chamber 164.

OPERATION

*Initial charging of the equipment when a car is empty*

Assuming a freight car embodying the invention shown in Fig. 1 to be empty and separated from a train, the brakes on the car released, and the brake pipe 1 of the car depleted of fluid under pressure, the brake control valve device 3 will be in brake applied position and the several other parts of the equipment will be in the position in which they are shown in Figs. 1, 2 and 3.

Now if the empty freight car is coupled into a train, the brake pipe 1 will, of course, be connected at each end of the car to the corresponding brake pipe at the adjacent end of each adjacent car of the train and as a result the brake equipment will be in condition to be charged with fluid under pressure in the usual manner. In initial charging of the equipment, fluid under pressure supplied in the usual manner to the brake pipe 1 flows through the branch pipe 2 to the chambers at the faces of the service and emergency pistons of the brake control valve device 3, moving the pistons in due course to their brake release and equipment charging position. Fluid under pressure will then flow to the several other chambers of the brake control valve device 3, and thence in the usual manner, to the auxiliary reservoir 4 by way of a pipe 191, and to the control reservoir 5 by way of a pipe 192. At the same time, fluid under pressure will also flow from the brake pipe 1 through branch pipe 2, a passage (not shown) in the brake control valve device 3, and pipe and passage 29 to the chamber 28 in the cut-off valve device 7. From chamber 28 fluid under pressure flows through the tubular valve seat member 34 and thence by way of port 35, and connected passage and pipe 36, to branch pipes 37 and 38. Fluid under pressure also flows from the chamber 28 through passage 24 and choke 25 to the chamber 20 on the left-hand side of the diaphragm 13.

From the branch pipe 37 fluid under pressure flows through the passage 149 in the load measuring mechanism 10 to the chamber 151. In response to the pressure of fluid thus supplied to the chamber 151, piston member 152 will move downward against the opposing pressure of the spring 179, effecting, through the medium of diaphragm 156, hollow rod 159, spring seat 187, and metering spring 189, downward movement of the hollow rod 174. The piston member 152 and hollow rod 174 will thus be moved downward until the lower end of the piston member contacts the stop 190 carried by the non-pressure head 145. Since it has been assumed that the car is empty, the load measuring mechanism 10 and bolster 147 will be at a maximum distance from the stop 185. Consequently, the cap screw 184 carried by the hollow rod 174 will be moved into contact with the stop 185 at substantially the same time as the lower end of the piston member 152 contacts the stop 190 carried by the non-pressure head 145.

The fluid under pressure supplied to the chamber 151, in addition to moving the piston member 152 downward, flows from the chamber 151 through the port 171a in the cap 171 to chamber 168. Since the disc valve 169 is unseated, as shown in Fig. 1, fluid under pressure will flow from chamber 168 through the bore 167 to the chamber 164 at the upper side of diaphragm 156 and thence through the passage 165 to the annular chamber 166. The fluid thus supplied to the annular chamber 166 will flow therefrom through the passage 150 and the pipe and passage 143 to the chamber 138 in the load compensating valve device 9 (Fig. 3).

Fluid under pressure will flow from the chamber 151 to the chambers 164 and 138, as just described, until the pressure in chamber 164 and acting on the effective area of diaphragm 156 is increased sufficiently to deflect this diaphragm, hollow rod 159 and spring seat 187 downward against the opposing pressure of the metering spring 189, it being noted that the hollow rod 174 remains stationary since the head of cap screw 184 now rests against the stop 185 on the truck spring plank 186. As the diaghragm 156 and hollow rod 159 are thus moved in a downward direction, the disc valve 169 will be caused to move in a downward direction by the spring 172 until the valve 169 contacts the valve seat 170 to cut off further flow of fluid under pressure from chamber 168 to the chambers 164 (Fig. 1) and 138 (Fig. 3).

From the above, it is apparent that the pressure obtained in the chambers 164 and 138 is dependent upon the amount the metering spring 189 is compressed after the head of cap nut 184 is moved into contact with the stop 185. Since the head of cap nut 184 contacts the stop 185 at substantially the same time as the piston member 152 contacts the stop 190, the metering spring 189 is compressed only enough to permit the disc valve 169 to be moved from the position in which it is shown in Fig. 1 to the position in which it contacts the valve seat 170. Consequently, the pressure obtained in the chambers 164 and 138 is comparatively low.

The fluid under pressure supplied to the branch pipe 38 from the pipe and passage 36, as has heretofore been explained, flows through the passage 126 in the load compensating valve device 9 (Fig. 3) to the volume chamber 127 and the chamber 119 at the lower side of the diaphragm 114 of the locking portion 41. When a sufficient pressure of fluid is thus obtained in chamber 119 to overcome the opposing pressure of spring 120 on diaphragm 114, the diaphragm will deflect against the spring and move the diaphragm follower 113 upward from the position in which it is shown in Fig. 3 to a position in which the follower contacts the collar 124 formed on the plunger 109. As the diaphragm follower 113 is thus moved upward, the ports 132 therein are moved out of registry with the passageway 131 to close communication between the chamber 130 and the chamber 118 which is connected to the atmosphere through passages 125 and 78.

The continued supply of fluid under pressure to the chamber 119, after the diaphragm follower 113 has been moved into contact with collar 124, will increase the pressure therein, and when a sufficient pressure of fluid is obtained to overcome the combined opposing pressure of the springs 120 and 123, the diaphragm 114 will deflect upward against these springs and move the plunger 109 and friction shoe 111 out of locking contact with the hollow sleeve member 92 followed by unseating of the disc valve member 139. Upon release of the friction shoe 111 from hollow sleeve member 92 and unseating of disc valve member 139, fluid under pressure now present in the chamber 138, as hereinbefore explained, will flow through chamber 130, passage 136, chamber 46, and passage 65 to chamber 63 and promptly causes diaphragm 56 to deflect in the direction of the right hand and move the diaphragm follower 57, rod 51, spring seat 48, hollow sleeve member 92, disc valve 97, and combined spring seat and valve guide member 94, spring 98, movable abutment 70 and diaphrams 72 and 101 in the same direction against the opposing pressure of the regulating spring 50 until this opposing pressure balances the fluid pressure acting in the chamber 63. It may be noted that the intermediate portion of diaphragm 101 is unwrapped or moved away from the paraboloid surface 101 as the movable abutment 70 is moved in the direction of the right hand to increase the effective area of the diaphragm. However, since the car has been assumed to be empty, the degree of pressure obtained in the chamber 63 during this load weighing operation will be comparatively low as previously explained. Therefore, the amount of unwrapping of the diaphragm 101 from the paraboloid surface 100 and the increase in the effective area of the diaphragm 101 is small.

While the hollow sleeve member 92 and effective area of diaphragm 101 are being adjusted to a position corresponding to the empty condition of the freight car, as above described, the pressure of fluid in the brake pipe 1, the chamber 28 of the cut-off valve device 7 (Fig. 1) and the chamber 20 on the left-hand side of the diaphragm 13, which is in communication with the chamber 28 through the passage 24 and choke 25 therein, will continue to increase. When the pressure in chamber 20 reaches the chosen pressure of thirty-five pounds per square inch, such pressure will deflect diaphragm 13 against spring 23 and move the hollow plunger 15 to a position in which the spring 32 is effective to move the disc valve 30 to a cut-off position defined by contact of the disc valve with a valve seat 34a formed on the left-hand end of tubular valve seat member 34.

In this cut-off position of disc valve 30, the supply of fluid under pressure from the brake pipe 1 to the pipe 36 will be cut off. However, as the pressure in the brake pipe 1 increases above the chosen pressure of thirty-five pounds per square inch, the pressure in the chambers 28 and 20 will also increase by reason of the supply thereto through the branch pipe 2, brake control valve device 3 and pipe and passage 29. As the pressure in the chamber 20 is thus increased, such pressure will deflect the diaphragm 13 in the direction of the right hand against the force of the spring 23 and move the valve seat 31 formed on the left-hand end of hollow plunger 15 away from the disc valve 30 to connect the passage and pipe 36 and the branch pipes 37 and 38 to the atmosphere via port 35, the space between the outer periphery of the hollow plunger 15 and the inner wall surface of the tubular valve seat member 34, past the valve seat 31, through the interior of the hollow plunger 15 and a port 93 in the cover 12.

Such venting of fluid under pressure from branch pipe 38 will result in venting of the passage 126 and chamber 119 beneath the diaphragm 114 of the locking portion 41 of the load compensating valve device 9. The venting of chamber 119 will permit springs 123 and 120 to respectively move the plunger 109 and friction shoe 111 into locking contact with the hollow sleeve member 92 and the ports 132 in the diaphragm follower 113 into registry with the passage 131 in the plunger 109. Movement of the friction shoe 111 into locking contact with sleeve member 92 will lock the sleeve member in its empty position.

As the plunger 109 is moved downward in response to the venting of the chamber 119, the spring 142 is effective to move the disc valve member 139 downward into contact with the annular valve seat 140 to close communication between chamber 138 and chamber 130. Upon further downward movement of the plunger 109 by the springs 120 and 123 after the valve 139 contacts annular valve seat 140, the upper end of the plunger is moved away from the lower face of the valve 139 and, upon the ports 132 moving into registry with the passage 131, the chamber 63, at the left-hand side of the diaphragm 56, will be vented to atmosphere via passage 65, chamber 46, passage 136, chamber 130, passage 131, ports 132, chamber 118, passage 125 and passage 78. The venting of chamber 63 permits the spring 50 to move the diaphragm 56, diaphragm follower 57, rod 51 and spring seat 48 to the position in which they are shown in Fig. 3.

The venting of the branch pipe 37 is effective to vent the chamber 151 in the load measuring mechanism 10 simultaneously with the venting of the chamber 119 in the load compensating valve device 9. As the chamber 151 is thus vented, the springs 179 and 189 are rendered effective to move the parts of the load measuring mechanism 10 to the position in which they are shown in Fig. 1 in which position the head of the cap screw 184 is disposed above and away from the stop 185 to prevent wear and chattering resulting from the vibration of the parts of a freight car as it travels over the irregularities in a railway track.

*Application of the brakes on an empty car*

When it is desired to effect an application of the brakes, the brake pipe pressure is reduced in the usual manner, causing the brake control valve device 3 to function, as explained in the hereinbefore-mentioned United States patent application, Serial No. 683,661 of Richard L. Wilson and William B. Jeffrey, to supply fluid under pressure from the auxiliary reservoir 4 to the pipe 108 and thence through the limiting valve device 6 to the pipe and passage 107 which is connected to the chamber 106 in the load compensating valve device 9. The pressure thus supplied to the chamber 106 will act on the effective area of diaphragm 101, which now is a minimum, to move the movable abutment 70, the center of diaphragm 72, nut 74 and the bushing 89, on which the supply valve seat 90 is formed, in the direction of the left hand to effect unseating of the fluted disc valve 97 from the supply valve seat. Fluid under pressure from the chamber 106 will then flow through the hollow nut 104, the interior of the movable abutment 70, bore 88, ports 95 in the combined spring seat and valve guide member 94, past the open fluted disc valve 97 and through the interior of the bushing 89 to the chamber 79. Fluid under pressure thus supplied to the chamber 79 will flow through passage and pipe 86 to the brake cylinder 8 and through the passage 80 and choke 81 to the chamber 76 at the left-hand side of the diaphragm 72 until such pressure acting on diaphragm 72 is increased to a degree to slightly overbalance the force created by pressure of fluid in chamber 106 acting on the effective area of diaphragm 101. Diaphragm 72 will thus be deflected in the direction of the right hand to move nut 74, and bushing 89 in the same direction until the supply valve seat 90 is brought into contact with the disc valve 97 to cut off flow of fluid under pressure to chambers 79 and 76 and the brake cylinder 8. The pressure obtained in the brake cylinder is thus limited in accordance with the load (empty) adjustment of diaphragm 101 relative to paraboloid surface 100.

*Release of the brakes with the equipment conditioned for empty car operation*

When it is desired to effect a release of the brakes, the brake pipe pressure is increased in the usual manner, causing the brake control valve device 3 to function to establish communication from the chamber 106 in the self-lapping valve mechanism 40 of the load compensating valve device 9 to atmosphere by way of the pipe and passage 107, limiting valve device 6, pipe 108, and the brake controlling valve mechanism 3. Upon the release of fluid under pressure from the chamber 106, the opposing pressure of fluid in the chamber 76 acting on diaphragm 72 will deflect same and move the nut 74 in the direction of the right hand to cause the disc valve 97 to be unseated from the exhaust valve seat 93 formed on the right-hand end of the hollow sleeve member 92, whereupon fluid under pressure will be released from the brake cylinder 8 via pipe and passage 86 and from the chambers 79 and 76, the latter chamber via choke 81 and passage 80. In this manner, fluid under pressure will be released from the chambers 76, 79 and 106 and the brake cylinder 8 until the pressure in these chambers and the brake cylinder is reduced to substantially atmospheric pressure whereupon the spring 98 moves the disc valve 97 into contact with the exhaust valve seat 93.

Upon the release of fluid under pressure from the brake cylinder 8, a return spring 194 will return the brake cylinder piston to its release position to cause release of brakes on the car.

*Initial charging of the equipment when a car is partially or fully loaded*

Let it be assumed that an empty freight car embodying the invention shown in Fig. 1 has been set off on a siding and then partially or fully loaded. When the car is again coupled into a train, the brakes on the car are released, the brake pipe 1 is depleted of fluid under pressure, the brake control valve device 3 is in its brake applied position and the several other parts of the equipment are in the position in which they are shown in Figs. 1, 2 and 3.

Upon the supply of fluid under pressure to the brake pipe 1, after the car is coupled into the train, fluid under pressure flows through the branch pipe 2 to the brake control valve device 3 to effect movement of the pistons and other parts thereof to their brake release and equipment charging position. The auxiliary reservoir 4, the control reservoir 5, the chamber 119 in load compensating valve device 9, and the chamber 151 in the load measuring mechanism 10 are each charged from the brake pipe 1 in the manner hereinbefore described in connection with the initial charging of an empty car.

In response to the pressure of fluid thus supplied to the chamber 151 of the load measuring mechanism 10, the piston member 152 and hollow rod 174 will be moved downward as hereinbefore described. Since it has been assumed that the car is now partially or fully loaded, the load measuring mechanism 10 and the bolster 147 (Fig. 2) consequently will have been moved downwardly relative to the fixed stop 185 from the position they occupied when the car was empty by reason of the usual truck springs (see Fig. 2) yielding to the additional weight placed on the car. Therefore the head of the cap screw 184 carried by the hollow rod 174 will be brought into contact with the stop 185 prior to the lower end of the piston member 152 contacting the stop 190 carried by the non-pressure head 145.

The continued supply of fluid under pressure to the chamber 151, after the head of the cap screw 184 contacts the stop 185, will increase the pressure therein. Upon this pressure being increased sufficiently to overcome the combined opposing pressures of the spring 179 and the metering spring 189, the piston member 152 will move downward, in response to continued supply of fluid under pressure to the chamber 151, against the opposing pressures of the springs until the lower end of the piston member 152 contacts the stop 190.

The fluid under pressure supplied to the chamber 151 flows therefrom to the chamber 138 in the load compensating valve device 9, as hereinbefore described in connection with operation of the load measuring mechanism 10 for an empty car, until the pressure in the chamber 164 has been increased sufficiently to deflect the diaphragm 156 downward against the opposing force of the now considerably compressed metering spring 189 and permit the spring 172 to seat the disc valve 169 on the valve seat 170 to cut off further flow to the chamber 138.

From the above, it is apparent that when a car is partially or fully loaded, the pressure built up in the chamber 138 before the valve 169 is seated increases in proportion to the load on the car.

The fluid under pressure supplied to the chamber 119 beneath the diaphragm 114 of the locking portion 41 of the load compensating valve device 9 is effective to unseat the disc valve 139. Upon the unseating of the disc valve 139, the fluid under pressure present in the chamber 138 will flow through chamber 130, passage 136, chamber 46 and passage 65 to chamber 63 and promptly cause diaphragm 56 to deflect in the direction of the right hand. Such movement of diaphragm 56 effects corresponding movement of the diaphragm follower 57, rod 51, spring seat 48, and hollow sleeve member 92, which correspondingly shifts disc valve 97 and combined spring seat and valve guide member 94 away from the annular valve seat 90 in the same direction, against the opposing pressure of the regulating spring 50 until this opposing pressure balances the fluid pressure acting in the chamber 63.

Since spring 98, which biases the guide member 94 and disc valve 97 toward the annular valve seat 90, reacts against the movable abutment 70, corresponding movement of the abutment 70 in the right-hand direction occurs to effect a corresponding degree of unwrapping of diaphragm 101 from the paraboloid surface 100, thereby effecting an increase in the effective area of the diaphragm in direct proportion to the amount of the axial displacement of the abutment 70.

Since the pressure supplied to the chamber 63 when the car is partially or fully loaded is in direct proportion to the load on the car, the increase in the effective area of diaphragm 101 is likewise in direct proportion or straight-line relationship to the load on the car.

After the hollow sleeve member 92 and the effective area of the diaphragm 101 are adjusted to their respective positions according to the load on the car, and upon the brake pipe pressure increasing to the hereinbefore-mentioned chosen pressure of thirty-five pounds per square inch, the cut-off valve 7 will operate, as hereinbefore described, to cut off the flow of fluid under pressure from the brake pipe 1 to the load compensating valve device 9 and the load measuring mechanism 10 and then, upon the pressure in the brake pipe increasing above thirty-five pounds per square inch, vent the branch pipes 37 and 38 to cause the diaphragm 56 and locking mechanism 41 of the load compensating valve device 9 and the parts of load measuring mechanism 10 to return to the positions in which they are shown in Fig. 3 and Fig. 1, respectively, in which the sleeve member 92 is locked against movement.

*Application of the brakes on a partially loaded or fully loaded car*

When an application of the brakes is made on a partially loaded or a fully loaded car by effecting a reduction in brake pipe pressure, the operation of the brake control valve device 3 will be identical with the operation for an empty car. From this it will be understood that fluid under pressure will be supplied through pipe 108 and the limiting valve 6 to the pipe and passage 107 which is connected to the chamber 106 in the load compensating valve device 9. It will be understood that the diaphragm 101 will now be in some position to the right of that in which it is shown in Fig. 3 and that the effective area thereof will have been increased proportionately to the increase in the load over that when the car was empty.

When the fluid under pressure acting in chamber 106 over this greater effective area of diaphragm 101 is sufficient to overcome the pressure of the spring 98, the movable abutment 70, diaphragm 72 and nut 74 will be caused to move in the direction of the left hand whereby the supply valve seat 90 is moved away from the disc valve 97 which remains at rest by reason of its contact with the exhaust valve seat 93 on sleeve member 92 which is now locked in position. Fluid under pressure in the chamber 106 will now flow by way of the hollow nut 104, the interior of movable abutment 70, bore 88, ports 95, past the open fluted disc valve 97, and through the interior of the bushing 89 to the chamber 79. As hereinbefore described, this fluid under pressure flows to the brake cylinder 8 and the chamber 76 until such pressure acting on the diaphragm 72 is increased to a degree to slightly overbalance the force created by pressure of fluid in chamber 106 acting on diaphragm 101. In response to this preponderance of pressure in the chamber 76, the diaphragm 72 will deflect in the direction of the right hand to move the supply valve seat 90 into contact with the disc valve 97 to cut off further flow of fluid under pressure to the chambers 79 and 76 and the brake cylinder 8. Since the effective area of the diaphragm 101 is increased in proportion to the load and this additional effective area requires a greater pressure acting in chamber 76 on the diaphragm 72 in order to move the supply valve seat 90 back into contact with the disc valve 97, to cut off flow of fluid under pressure to the brake cylinder 8, it is apparent that the degree of pressure supplied to the brake cylinder increases in direct proportion to an increase in the load on car.

*Release of the brakes on a partially loaded or fully loaded car*

When it is desired to effect a release of the brakes on a partially loaded or fully loaded car, the brake pipe pressure is increased in the usual manner. The brake control valve device 3 and the self-lapping valve mechanism 40 of the load compensating valve device 9 then operate in response to this increase in brake pipe pressure to release fluid under pressure from the brake cylinder 8 in the same manner as hereinbefore described for an empty car.

DESCRIPTION—FIG. 4

Figure 4:
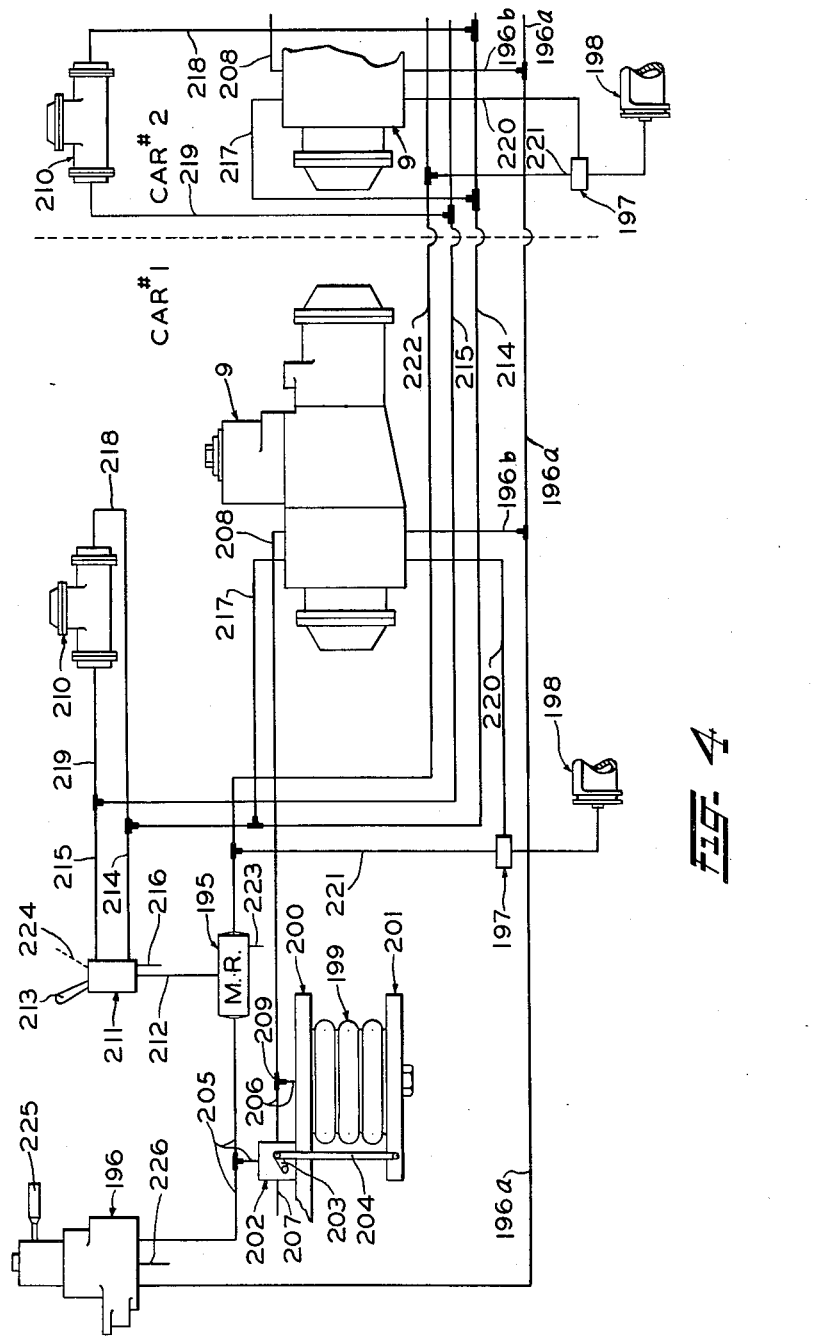
Fig. 4 is a diagrammatic view of a brake equipment for a railway passenger train, the cars of which have air springs, showing an arrangement whereby the load compensating valve device of Fig. 3 may be utilized under air spring pressure control.

A second embodiment of the invention is shown in Fig. 4 as a variable load straight-air brake equipment for a railway passenger train the locomotive and cars of which are equipped with air springs. The brake equipment for the first car or locomotive of the train shown in Fig. 4 comprises a main reservoir 195, a straight-air brake valve device 196, such as that described in United States Patent No. 2,042,112, issued May 26, 1936 to E. K. Lynn, a straight-air control pipe 196a, a load compensating valve device 9, as shown in Fig. 3 and described in detail in connection with the first embodiment of the invention, a relay valve device 197, such as that described in United States Patent No. 2,096,491, issued October 19, 1937 to E. E. Hewitt, and a brake cylinder device 198 which may be of the standard type.

The air spring equipment for the locomotive and each passenger car comprises a bellows-type air spring 199 interposed between a sprung member, such as a portion 200 of a locomotive or car body; and an unsprung member, such as an axle housing 201, for resiliently supporting the locomotive or car body relative to the axle housing, and a leveling valve device 202 for controlling the pressure of fluid in the air spring 199.

The leveling valve device 202 may, for purposes of illustration, be of the type disclosed in the copending United States patent application of Harry C. May and Joseph F. Frola, Serial No. 568,113, filed February 27, 1956, now Patent No. 2,945,690, and assigned to the assignee of the present invention. The leveling valve device 202 is mounted on the portion 200 of the locomotive or car body, and comprises, briefly, valve means (not shown) controlled by a lever 203 pivotally connected at one end to a rotatable cam shaft (not shown) and at the opposite end to one end of a link 204 that, at its opposite end, is anchored to an unsprung member, such as the axle housing 201. The valve means (not shown) of the leveling valve 202 is operable by the link 204, lever 203 and the cam shaft (not shown) to supply fluid under pressure from the main reservoir 195, connected to the leveling valve 202 and the brake valve 196 by a pipe 205, to the air spring 199 via a pipe 206 and release fluid under pressure from the air spring via the pipe 206 and a vent pipe 207, so as to maintain in the air spring 199 the proper pressure necessary to maintain the locomotive or car body 200 at a constant preselected height relative to the axle housing 201.

The pressure of air thus established in the air spring 199 is an accurate measure of the load imposed by the weight of the locomotive or car body 200 on the axle housing 201. Therefore the passage 143 in the load compensating valve device 9 is connected by means of a pipe 208 and a pipe T 209 to the pipe 206 in order to maintain in the chamber 138 of the valve device 9 a pressure proportional to the load on the car as was provided by the load measuring mechanism 10 of the variable load brake equipment shown in Fig. 1.

The load on a railway passenger car varies according to the number of passengers on the car. Since the number of passengers on the car changes only when a train is stopped at a station to permit egress and ingress of passengers, this is the appropriate time to condition the load compensating valve device 9 to provide the proper degree of braking on the car when the train is again started. Therefore, in order to adjust the load compensating valve device 9 according to the load on the car each time the train is stopped, and to control the operation of a door engine 210 which is effective to open and close the car doors, a manually operated door control valve device 211 is provided on the locomotive or leading car of the train. The door control valve device 211 is connected by a pipe 212 to the main reservoir 195. The door control valve device 211 is provided with a handle 213. The handle 213 is manually operative to a first position in which a first communication is established from the pipe 212 to a door opening pipe 214 extending from the locomotive or leading car back through each car of the train, and a second communication is established from a door closing pipe 215, also extending from the locomotive or leading car back through each car of the train, to an atmospheric exhaust pipe 216, and to a second position in which a third communication is established from the door opening pipe 214 to the exhaust pipe 216 and a fourth communication is established from the supply pipe 212 to the door closing pipe 215.

On the locomotive or leading car and on each car in the train, the door opening pipe 214 is connected by a first branch pipe 217 to the passage 126 in the load compensating valve device 9 and by a second branch pipe 218 to one end of the door engine 210 on the respective locomotive or car. A third branch pipe 219 on the respective locomotive or car connects the opposite end of the door engine 210 to the door closing pipe 215 extending from end to end of each car.

Each car of the train is provided with a relay valve device and a brake cylinder device similar to the relay valve device 197 and the brake cylinder device 198 provided on the locomotive or leading car. Therefore, in order to provide for operating of the relay valve devices to supply fluid under pressure to the brake cylinders to a degree corresponding to the load on the locomotive or leading car and each other car in the train, the control port of each relay valve device is connected by a pipe 220 to the passage 86 in the self-lapping valve mechanism 41 of each load compensating valve device 9.

To place control of each self-lapping valve mechanism 40 under the control of the engineer on the locomotive or leading car, the straight-air pipe 196a which extends from car to car through the train is connected by a branch pipe 196b to the passage 107 in each self-lapping mechanism.

In order to provide a source of fluid under pressure from which the relay valve device on the locomotive and each car may supply fluid under pressure to the brake cylinder device on the locomotive or respective car, each relay valve device is connected by a branch pipe 221 to a main reservoir supply pipe 222 which extends from the main reservoir 195 on the locomotive or leading car back through each car of the train.

OPERATION

Initial charging of the equipment

Assume that the locomotive or leading car of a passenger train is provided with the equipment shown in Fig. 4 of the drawings and each other car is provided with the same equipment except omitting the brake valve 196, main reservoir 195 and the door control valve device 211. Further assume that fluid under pressure is supplied to the main reservoir 195 through a pipe 223 from an air compressor (not shown). The fluid under pressure thus supplied to the main reservoir 195 will flow through the pipe 205 to the brake valve 196 and to the leveling valve device 202. Upon the supply of fluid under pressure to the leveling valve device 202, this valve device will operate to supply fluid under pressure to the air spring 199 until the pressure therein is commensurate with the load which may be taken as the weight of the car body since it may be assumed that there are now no passengers aboard the car.

Application of the brakes on an empty car

After the brake equipment on the locomotive and cars of the train is charged, as described above, and before the train is moved, the load compensating valve device 9 on the locomotive and each car should be adjusted to provide the proper braking force for an empty car. In order to adjust the load compensating valve devices 9 to provide the proper braking force for an empty car, the engineer on the locomotive or leading car will move the handle 213 of the door control valve device 211 from the door-closed position in which it is shown in Fig. 4 to a door-open position indicated by a broken line 224. Upon movement of the handle 213 from its door-closed position to its door-open position, a first communication will be established from the door-closing pipe 215 to the atmospheric exhaust pipe 216 to vent fluid under pressure from the pipe 215, each branch pipe 219 and the right-hand end of each door engine 210 on the locomotive or leading car and each other car in the train. At the same time a second communication will be established from the supply pipe 212 to the door-opening pipe 214 to effect the supply of fluid under pressure from the main reservoir 195 to the door-opening pipe 214. The fluid under pressure thus supplied to the door-opening pipe 214 will flow through the branch pipe 218 on each car to the right-hand end of the respective door engine 210 to effect opening of the car doors.

Fluid under pressure supplied to the door opening pipe 214, as explained above, will also flow through the branch pipe 217 on each car to the passage 126 and chamber 119 in the load compensating valve device 9 on the respective car.

Upon the supply of fluid under pressure to the chamber 119 of each load compensating valve device 9 on the locomotive and cars of the train, the locking mechanism 41 is operated, in the manner hereinbefore explained in connection with the first embodiment of the invention, to move friction shoe 111 out of locking contact with hollow sleeve member 92 and to unseat the valve 139 from its seat 140. Since the chamber 138 is connected by passage 143, pipe 208, pipe T 209 and pipe 206 to the air spring 199, the pressure in chamber 138 is proportional to the load on the car. As it has been assumed that no passengers are aboard the train, the pressure in the air spring 199 and chamber 138 will be comparatively low. Therefore, upon the unseating of the valve 139, the fluid under the comparatively low pressure present in the chamber 138 will flow therefrom past the unseated valve 139 and through the bore in the valve seat member 137 to the chamber 130 from whence it flows through passage 136, chamber 46 and passage 65 to the chamber 63. The fluid under pressure thus supplied to the chamber 63 is effective on the diaphragm 56 to adjust the self-lapping valve mechanism 40 of the load compensating valve device 9 to its empty position in the manner hereinbefore explained.

After the self-lapping valve mechanisms 40 of the load compensating valves 9 on the locomotive and cars have been adjusted to provide the proper braking force on the respective empty locomotive and cars in the train, the engineer on the locomotive or leading car will move the handle 213 of the door control valve device 211 back to the door closing position in which position it is shown in Fig. 4 of the drawings. Upon movement of the handle 213 to the door closing position, the door opening pipe 214 will be connected to the exhaust pipe 216 and the door-closing pipe 215 will be connected to the supply pipe 212.

When the door opening pipe 214 is connected to the exhaust pipe 216, the chamber 119 in the locking portion 41 of each load compensating valve device 9 will be vented to atmosphere via passage 126, branch pipe 217, door opening pipe 214, door control valve device 211 and exhaust pipe 216, whereupon the locking mechanism 41 of each load compensating valve device 9 locks the hollow sleeve 92 of each self-lapping valve mechanism 40 in its empty position.

After the self-lapping valve mechanisms 41 of the load compensating valve devices 9 have been adjusted, as explained above, to provide the proper degree of braking on the empty cars, the brake equipment is in condition for the empty train to be moved to another point on the line.

Now let it be supposed that while the empty train is traveling along the road under propulsion power, the engineer desires to initiate a brake application to bring the train to a stop. To do so he will first cut off the propulsion power by moving a controller handle (not shown) to a power-off position.

Following such operation of the controller handle, the engineer then shifts a handle 225 of the straight-air brake valve 196 out of its normal brake release position into its application zone an amount corresponding to the desired degree of brake application.

The straight-air control pipe 196a and branch pipes 196b are accordingly charged to a pressure corresponding to the position of the brake valve handle 225 in its application zone such as, for example, fifty pounds per square inch. Upon the charging of the straight-air control pipe 196a as just described, the corresponding fluid pressure established in the chamber 106 of the self-lapping valve mechanism 40 of the load compensating valve device 9 on the locomotive or leading car and each other car in the train will operate, in the manner hereinbefore described, to supply fluid under pressure from the chamber 106 to the pipe 220 and relay valve device 197 until the pressure therein corresponds to the required pressure necessary to properly brake an empty car. Each of the relay valve devices will then be operated by the control pressure supplied thereto to supply fluid under pressure from the main reservoir pipe 222 and branch pipe 221 to the brake cylinder 198 on each car until the pressure therein is the same as, or a predetermined ratio, to the pressure in the pipe 220 which pressure is the required pressure for braking an empty car.

*Release of the brakes on an empty car*

When the engineer again desires to start the train, he will of course first release the brakes by restoring the brake valve handle 225 to its normal or brake release position to reduce the pressure in the straight-air control pipe 196a to its normal or atmospheric pressure. The fluid under pressure in the chamber 106 of each load compensating valve device 9 will thus be vented to atmosphere by flow back through passage 107, pipes 196b and 196a to the brake valve 196 and thence to atmosphere through an exhaust pipe 226 of the brake valve 196. Upon the release of fluid under pressure from the chambers 106, each self-lapping valve mechanism 40 will operate to release fluid under pressure from its corresponding relay valve device which in turn operates to vent fluid under pressure from the brake cylinder to which it is connected to release the brakes.

*Application of the brakes on a loaded car*

Assume that a train provided with the brake equipment shown in Fig. 4 and having no passengers aboard is stopped by shutting off the propulsion power and making a straight-air brake application, at a station at which the train is to be loaded to its maximum seating capacity. Further assume that the leading car is a motive power car and also a passenger car.

After the train is brought to a stop, the engineer on the leading car will move the handle 213 of the door control valve device 211 from its door closed position to its door open position to effect opening of the doors and the supply of fluid under pressure to the chamber 119 of the locking portion 41 of the load compensating valve device 9 on each car. Each locking device 41 operates in response to the supply of fluid under pressure to the respective chamber 119 to move the friction shoe 111 upward out of locking contact with the hollow sleeve member 92 and to unseat the valve 139 from the annular seat 140.

Since the doors remain open while the train is being loaded, the friction shoe 111 will remain out of locking contact with hollow sleeve member 92 and valve 139 will be maintained unseated while the passengers are boarding the car.

It is apparent that the load on the car increases as the number of passengers on the car increases. Therefore, this increase in load on the car is effective to cause the leveling valve device 202 to operate to supply fluid under pressure from the main reservoir 195 to the air spring 199 to increase the pressure therein and maintain the body of the car at a constant height above the axle housing 201. Since the passage 143 in the load compensating valve device 9 is connected to the interior of the air spring 199 through the pipes 206 and 208 and pipe T 209, and the valve 139 is open, as explained above, the pressure in the chamber 63 in valve device 9 increases simultaneously as the pressure in the air spring 199 increases which latter pressure is increasing as the load on the car is increasing. Therefore, when the car is loaded to its maximum seating capacity, the pressure in the chamber 63 is proportional to the load on the car and is substantially higher than when the car is empty.

The higher pressure thus built up in the chamber 63, during the time the car is being loaded, is effective to deflect the diaphragm 56 against the pressure of spring 50 in the direction of the right hand to move the hollow sleeve member 92, disc valve 97, and the combined spring seat and valve guide member 94 in the same direction against the pressure of the spring 98 and the fluid pressure in the chamber 106 acting over the area of the disc valve 97 within the supply valve seat 90. As the disc valve 97 is thus moved, it is carried away from the supply valve seat 90 whereupon the straight-air pipe pressure present in the chamber 106, since the brakes were applied when the train was stopped, will flow past the unseated valve 97 to the chambers 79 and 76 and through the passage 86 and pipe 220 to the relay valve device 197 until the pressure in the chamber 76 is increased sufficiently to deflect the diaphragm 72 in the direction of the right hand and move the abutment 71 and nut 74 in the same direction until the supply valve seat 90 carried by the nut 74 is brought into contact with the disc valve 97.

As the pressure in the pipe 220 is increased, as just exlained, the relay valve device 197 will operate in response to this increase in the pressure in pipe 220 to correspondingly increase the pressure in the brake cylinder 198 to increase the braking force on the car as the load on the car is increased until the car is fully loaded.

It should be noted that as the abutment 71 is moved in the direction of the right hand by the deflection of diaphragm 72, more and more of the intermediate portion of the diaphragm 101 is unwrapped or moved away from the paraboloid surface 100 formed on the casing 66. This unwrapping of the diaphragm 101 from the surface 100 increases the effective area of the diaphragm subject to the fluid under pressure in the chamber 106.

When the car is fully loaded to its maximum seating capacity there will be no further increase in the pressure in the air springs 199 and the chambers 63 of the load compensating valve devices 9 on the various cars. Consequently the diaphragms 56 and 101, hollow sleeve member 92, disc valve 97 and combined spring seat and valve guide member 94 in each valve device 9 will cease to be moved in the direction of the right hand. After cessation of movement of hollow sleeve member 92 and disc valve 97, fluid under pressure will continue to flow from the chamber 106 to the chambers 79 and 76 and to the relay valve device 197 until the pressure in chamber 76 is increased sufficiently to deflect the diaphragm 72 in the direction of the right hand and move the supply valve seat 90 on the end of the bushing 89 carried by the nut 74 which is secured to the diaphragm 72 into contact with the disc valve 97 to stop the build of pressure in the brake cylinders.

From the above it is apparent that if the brakes on a train of empty cars are applied and the doors are opened to permit the ingress of passengers, the leveling valve device 202 on each car will automatically increase the pressure of fluid in the air spring 199 as the load increases in response to the ingress of passengers, and the load compensating valve device 9 will operate in response to the increase in pressure in the air spring to supply fluid under pressure to the relay valve device 197 which will be operated thereby to increase the pressure in the brake cylinder 198 to provide a braking force for the car in accordance with the load thereon.

*Release of the brakes on a loaded car*

After all passengers are aboard the cars and prior to releasing the brakes and starting the train, the engineer will move the handle 213 of the door control valve 211 to its door closing position to effect closing of the doors by venting the door opening pipe 214 and the supply fluid under pressure to the door closing pipe 215.

Fluid under pressure in the chamber 119 of the locking portion 41 of each load compensating valve device 9 is vented when the door opening pipe 214 is vented. Therefore, upon closing of the doors on the train, the locking portion 41 of each load compensating valve device 9 is operated to move the friction shoe 111 into locking contact with hollow sleeve member 92 to lock this sleeve member in its full load position. With the hollow sleeve member 92 locked in its full load position, the spring 98 is effective, by reason of contact at its opposite ends with the disc valve 97 which rest on the exhaust valve seat 93 formed on the right-hand end of hollow sleeve member 92 and the abutment 71 to which the center of the diaphragm 100 is secured, to maintain the diaphragm 100 in its unwrapped position in which its effcetive area is substantially greater than when the hollow sleeve member 92 occupies its empty position.

After the doors on the cars are closed and the load compensating valve devices 9 on the cars locked in their adjusted positions to provide the proper braking force for a fully-loaded car, the engineer may release the brakes on the train by moving the handle 225 of the straight-air brake valve device 196 from the position it occupies in its application zone back to its normal brake release position. Upon movement of the brake valve handle 225 to its brake release position, a communication is established between the straight-air control pipe 196a and the exhaust pipe 226 whereupon the chamber 106 in each load compensating valve device 9 on the various cars in the train is vented to atmosphere via passage 107, pipes 196b and 196a, brake valve 196 and exhaust pipe 226.

As fluid under pressure is vented from the chamber 106 in each load compensating valve device 9, the higher fluid pressure in the chamber 76 is effective to deflect the diaphragm 72 in the direction of the right hand and move the nut 74, bushing 89, supply valve seat 90, disc valve 97, combined spring seat and valve guide member 94, spring 98 and abutment 71 in the same direction whereupon the disc valve 97 is moved out of contact with exhaust valve seat 93. Upon movement of disc valve 97 out of contact with exhaust valve seat 93 fluid under pressure will be vented from the chamber 79 to atmosphere via the interior of bushing 89, past the unseated disc valve 97, and through the interior of the hollow sleeve member 92, slots 92a, chamber 64, passage 125 and passage 78. At the same time fluid under pressure will flow from the chamber 76 via choke 81 and passage 80 and from the relay valve device 197 via pipe 220 and passage 86 to the chamber 79 and thence to atmosphere through the above-mentioned venting communication. The pressure in the chambers 79 and 76 and in the relay valve device 197 will thus reduce substantially simultaneously with the reduction in pressure in the chamber 106 until the pressure in chamber 76 is slightly below the pressure in the chamber 106 or until the pressures in both chambers are substantially atmospheric whereupon the spring 98 will move the disc valve 97 into contact with the exhaust valve seat 93. The reduction in the pressure in each relay valve device 197, as just described, will cause the relay valve devices on the cars of the train to operate to vent fluid under pressure from the brake cylinder devices to release the brakes on the various cars in the train.

After the brakes on the train have been released as just explained, the engineer may start the train by moving the controller handle (not shown) to a power-on position to effect the supply of power to the driving wheels (not shown) of the leading car.

Subsequent brake applications can be made by the engineer by moving the brake valve handle 225 into its application zone to a position corresponding to the degree of braking desired. Movement of the handle 225 into its application zone effects charging of the straight-air pipe 196a and the chamber 106 in the self-lapping valve mechanism 40 of each load compensating valve device 9 on the various cars in the train. Each self-lapping valve mechanism 40 then operates in response to the supply of fluid under pressure to its chamber 106 to supply fluid under pressure from the chamber 106 to the corresponding relay valve device to a degree corresponding to the load on the car. The relay valve device then establishes the same or corresponding degree of pressure in the brake cylinder device on the car.

*Operation of the brake equipment upon detrainment of passengers*

Assume that the train provided with the brake equipment shown in Fig. 4 and loaded to its maximum seating capacity is stopped by shutting off the propulsion power and making a straight-air brake application at a station at which a substantial number or all of the passengers are to be detrained.

After the train is brought to a stop, the engineer will move the handle 213 of the door control device 211 from its door-closed position to its door-open position whereupon the doors on all the cars in the train will be opened and the locking portion 41 of the load compensating valve device 9 on each car will be operated to move friction shoe 111 out of locking contact with hollow sleeve member 92 and to unseat valve 139 from its seat 140 in the manner hereinbefore explained.

As the passengers detrain from each car the load thereon is reduced. Consequently, the leveling valve device 202 on each car operates in response to this reduction in load, to reduce the pressure in the air spring 199 and the chamber 63 of the load compensating valve device 9, which is connected at this time to the air spring as hereinbefore explained, by releasing fluid under pressure therefrom to atmosphere through the vent pipe 207.

As fluid under pressure is released from the chamber 63, as just explained, the spring 50 is rendered effective to move the spring seat 48, nuts 53 and 54, rod 51, and diaphragm followers 57 and 58 in the direction of the left hand to deflect the diaphragm 56 in the same direction. Since the friction shoe 111 is now out of locking contact with the hollow sleeve member 92, a spring 227, disposed between a collar 228 formed on the sleeve member and a wall 229 separating chambers 64 and 79, will be effective to move the sleeve member in the direction of the left hand as the diaphragm follower 57 is moved in this direction. As the hollow sleeve member 92 is thus moved in the direction of the left hand, the exhaust valve seat 93 formed on the right-hand end of the hollow sleeve member is moved away from the disc valve 97 which is prevented from moving at this time by reason of its contact with the supply valve seat 90. When the exhaust valve seat 93 is thus moved away from the disc valve 97, a communication is established between the chamber 79 and atmosphere via the interior of the bushing 89, past the unseated disc valve 97, the interior of hollow sleeve member 92, slots 92a, chamber 64, passage 125 and passage 78. Since the chamber 76 is connected to chamber 79 via choke 81 and passage 80, and the relay valve device 197 is connected to the chamber 76 via pipe 220 and passage 86, the pressure in the control port of the relay valve device 197 and in the chamber 76 will reduce substantially simultaneously as the pressure in the chamber 79 reduces. Therefore, the relay valve device 197 will be operated by this reduction in pressure in its control port to correspondingly reduce brake cylinder pressure.

The pressure in the chambers 79 and 76, and in the brake cylinder 198 will continue to reduce as the pressure in the chamber 63 and in the air spring 199 is reduced by operation of the leveling valve device 202 in response to the detraining of passengers from the car until the last detraining passenger has left the car. After cessation of the reduction in pressure in the chamber 63, the pressure in the chamber 79, and consequently in the chamber 76 and in the brake cylinder 198, will continue to reduce until this pressure is reduced sufficiently to permit the pressure present in the chamber 106 and acting over the effective area of the diaphragm 101 to deflect the diaphragm in the direction of the left hand and move the abutment 70, nut 74 and disc valve 97 in the same direction until the disc valve 97 is brought into contact with the exhaust valve seat 93 whereupon a further reduction in the pressure in chambers 79 and 76 and in the brake cylinder 198 is prevented.

From the above it is apparent that with the doors open and the brakes applied, the brake cylinder pressure and the air spring pressure on each car in the train are reduced as the load on the cars is reduced in direct proportion to the numbers of passengers detrained while the train is stopped.

Subsequent to the detraining of the passengers, the engineer will move the handle 213 of the door control valve device 211 back to its door closing position whereupon the doors on the cars will be closed and the hollow sleeve member 92 in each load compensating valve device 9 locked in its reduced load or empty position in the manner hereinbefore explained. After the doors are closed, the engineer will move the brake valve handle 225 to its release position to effect venting of the straight-air control pipe 196a and the chamber 106 of the self-lapping valve mechanism 40 of the load compensating valve device 9 on each car. Each self-lapping valve mechanism 40 will then operate in response to the venting of its chamber 106 to release the brakes on that particular car in the manner hereinbefore described. The engineer may now start the train and proceed in the usual way.

DESCRIPTION—FIGS. 5 AND 6

According to a third embodiment of the invention, as shown in Figs. 5 and 6, the load compensating valve device 9 shown in detail in Fig. 3, and the cut-off valve device 7 and the load measuring mechanism 10, shown in detail in Fig. 1, are connected to a direct release type of brake control valve device 230 and a compensating type of brake cylinder device 231 to provide a variable load or load compensating type of brake equipment for a railway freight car. Accordingly, like reference numerals have been used to designate the structure shown in Figs. 5 and 6 which is identical with that shown in Figs. 1, 2 and 3, and already described. Only such features of the structure and operation of the embodiment of Figs. 5 and 6 which differ from that of the embodiment of Figs. 1, 2 and 3 will hereinafter be described.

The direct release type of brake valve device 230 may be such as the well-known "AB" valve which is fully described in United States Patent No. 2,031,213 issued February 18, 1936 to Clyde C. Farmer and assigned to the assignee of the present application.

The compensating type of brake cylinder device 231 may be such as that fully described in United States Patent No. 2,875,864 issued March 3, 1959 to Walter B. Kirk and assigned to the assignee of the present application.

In view of the two above-mentioned patents, it is deemed unnecessary to show and describe in detail the brake control valve device 230 and the brake cylinder device 231. It will, of course, be understood that the brake control valve device 230 operates upon a service reduction in brake pipe pressure to supply fluid under pressure to effect a service application of the brakes, upon an emergency reduction in brake pipe pressure to effect an emergency application of the brakes, and upon an increase in brake pipe pressure to effect a full release of the brakes and the charging of the brake equipment. It will also be understood that the brake cylinder device 231 is effective to apply to the wheels of a freight car a braking force proportional to the difference in pressure of fluid acting on areas of different size in chambers 232 and 233 located on opposite sides of a differential type of piston 234 slidably mounted in a cylinder casing 235.

According to the embodiment of the invention shown in Figs. 5 and 6, the load measuring mechanism 10 is mounted on the truck bolster 147 in a position inverted with respect to the position in which it is shown in Fig. 2 and below a stop 236 (Fig. 6) carried by a portion 237 of a freight car truck side frame.

The embodiment of the invention shown in Figs. 5 and 6 further differs from the embodiment shown in Fig. 1 in that the limiting valve device 6 is omitted and the brake cylinder passage (not shown) in the direct release type of brake control valve device 230 is connected by a pipe 238 to the chamber 232 in the brake cylinder device 231. The pipe and passage 107 leading to the chamber 106 in the self-lapping valve mechanism 40 of the load compensating valve device 9 is connected to the outlet of a pipe T 239 disposed in the pipe 238 adjacent the brake control valve device 230 in order to provide for the supply of fluid under pressure to the chamber 106 when the valve device 230 is operated to its service or emergency position. The pipe and passage 86 leading to the chamber 79 in the self-lapping valve mechanism 40 is connected to the chamber 233 in the brake cylinder device 231.

In place of the control reservoir 5 shown in Fig. 1, there is provided for the brake control valve device 230 shown in Fig. 5, an emergency reservoir 240 which is connected to the valve device 230 by a pipe 241.

OPERATION

*Initial charging of the equipment when a car is empty*

When an empty freight car provided with the equipment shown in Figs. 5 and 6 is coupled into a train, fluid under pressure will flow from the charged portion of the train brake pipe through the brake pipe 1 and branch pipe 2 to the brake control valve device 230 which will then operate, as described in the hereinbefore-mentioned Patent No. 2,031,213, to effect charging of the auxiliary reservoir 4 and the emergency reservoir 240. At the same time, fluid under pressure will also flow from the brake pipe 1 through a passage (not shown) in the brake control valve device 230 and the pipe 29 to the cut-off valve device 7 which, as long as the brake pipe pressure is less than the hereinbefore-mentioned thirty-five pounds per square inch, permits fluid to flow from the pipe 29 to the pipe 36 and thence to the branch pipes 37 and 38.

Since the branch pipe 37 is connected to the passage 149 in the load measuring mechanism 10, as in the equipment shown in Fig. 1, the load measuring mechanism 10 will operate, as hereinbefore described, to move the cap screw 184 in an upward direction. Due to the fact that the car is empty, the bolster 147 will be at a maximum distance above the truck spring plank 186. Therefore, the head of the cap screw 184 will contact the stop 236 prior to the now upper end of the piston member 152 contacting the stop 190 (Fig. 1) carried by the non-pressure head 145. After the head of the cap screw 184 contacts the stop 236, the load measuring mechanism 10 operates, as hereinbefore described, to supply fluid under pressure through the passage 150, and pipe and passage 143 to the chamber 138 in the locking portion 41 of the load compensating valve device 9 until the pressure in the chamber 151 (Fig. 1) is built up sufficiently to further move the piston member 152 upward until the upper end thereof contacts the stop 190 and then deflects the diaphragm 156 until the spring 172 seats the disc valve 169 on its seat 170 to cut off flow from the chamber 151 to the chamber 138.

From the above, it is apparent that the load measuring mechanism 10 shown in Fig. 6 operates, when the car is empty, to effect the supply of fluid under pressure to the chamber 138 in the load compensating valve device 9 shown in Fig. 5 until the pressure therein reaches the same value as that obtained in the chamber 138 in the load compensating valve device 9 shown in Fig. 1 when a car having the equipment shown in Fig. 1 is fully loaded.

The fluid under pressure supplied through the cut-off valve device 7 to the pipe 36, in addition to flowing to the branch pipe 37 and load measuring mechanism 10, also flows through the branch pipe 38 and the passage 126 to the chamber 119 in the locking portion 41 of the load compensating valve device 9 shown in Fig. 5. The locking portion 41 operates in response to the supply of fluid under pressure to its chamber 119, in the manner hereinbefore explained, to move the friction shoe 111 out of locking contact with the hollow sleeve member 92 and to unseat the valve 139 from its seat 140.

When the valve 139 is unseated, the high pressure fluid present in the chamber 138 flows therefrom via the bore in the valve seat member 137, chamber 130, passage 136, chamber 46, and passage 65 to the chamber 63. The fluid under pressure thus supplied to the chamber 63 is effective to deflect the diaphragm 56 in the direction of the right hand against the opposing pressure of the spring 50 and move the hollow sleeve member 92 in the same direction until the fluid under pressure in the chamber 63 is balanced by the opposing pressure of the spring 50. Movement of the hollow sleeve member 92 in the direction of the right hand, as just explained, is effective to adjust the self-lapping valve mechanism 40 to the position in which the diaphragm 101 has its maximum effective area.

When brake pipe pressure is increased above thirty-five pounds per square inch, the cut-off valve 7 operates, as hereinbefore described, to cut off flow from pipe 29 to pipe 36 and then vent the pipe 36 and branch pipes 37 and 38 to atmosphere. Upon venting the branch pipe 37, the load measuring mechanism 10 is returned to its retracted position. Upon venting the branch pipe 38, the locking portion 40 operates to lock the hollow sleeve 92 in its adjusted position in which the diaphragm 101 has its maximum effective area.

*Application of the brakes on an empty car (Fig. 5)*

When it is desired to effect an application of the brakes, the brake pipe pressure is reduced in the usual manner. The brake control valve device 230 operates in response to a reduction in the brake pipe pressure, as described in Patent No. 2,031,213, to supply fluid under pressure from the auxiliary reservoir 4 in the case of a service application, and from the auxiliary reservoir 4 and the emergency reservoir 240 in the case of an emergency application, to the pipe 238 and thence to the chamber 232 of the brake cylinder device 231.

The fluid under pressure supplied to the pipe 238 also flows through the pipe T 239 and pipe and passage 107 to the chamber 106 in the self-lapping valve mechanism 40 of the load compensating valve device 9. The fluid under pressure thus supplied to the chamber 106 will act on the right-hand side of the diaphragm 101, which has been adjusted, as hereinbefore explained, to the position in which its effective area is maximum, and thereby operate the self-lapping valve mechanism 40, in the manner hereinbefore explained, to supply fluid under pressure from the chamber 106 to the chambers 79 and 76 and from the chamber 79 through the pipe and passage 86 to the compensating chamber 233 in the brake cylinder device 231 until the pressure in the chamber 76 and acting on the left-hand side of the diaphragm 72 is built up sufficiently to operate the self-lapping valve mechanism 40 to its lap position. Since the diaphragm 101 has been adjusted to its maximum effective area position, a substantial pressure will be built up in the chambers 79, 76 and 233 before the self-lapping valve mechanism 40 is moved to its lap position.

Referring to the brake cylinder device 231 shown in Fig. 5, it will be understood that the pressure of fluid in chamber 232 and acting over the full area of the brake cylinder piston 234 will prevail over the opposing pressures of a brake cylinder release spring 242 and of the fluid under pressure in chamber 233, acting over that portion of the piston 234 which serves to define the chamber 233 in an amount sufficient to transmit a braking force to the brake rigging (not shown) for braking an empty freight car to the degree called for by the degree of reduction in brake pipe pressure. By reason of the self-lapping arrangement of the valves in the self-lapping valve mechanism 40 a constant proportion of back pressure to the pressure in the chamber 232 will be maintained in the chamber 233 of the brake cylinder device 231. If the degree of back pressure in chamber 233 should exceed the predetermined proportion, this excess pressure acting in chamber 76 on the diaphragm 72 will cause the diaphragm to deflect in the direction of the right hand, as viewed in Fig. 3, carrying the disc valve 97 away from and out of contact with the exhaust valve seat 93 formed on the right-hand end of hollow sleeve 92. Fluid under pressure in the chambers 76, 79 and 233 will then flow past the valve seat 93 and through the hollow sleeve member 92 to the chamber 64 from whence it flows to atmosphere via passages 125 and 78. When this flow of fluid under pressure reduces the pressure in chamber 76 to the predetermined degree, the diaphragm 101 will act in response to the pressure in chamber 106 to return the disc valve 97 to seating contact with the exhaust valve seat 93.

*Release of the brakes with the equipment conditioned for empty car operation*

When it is desired to effect a release of the brakes, the brake pipe pressure is increased in the usual manner, causing the brake control valve device 230 to function, as explained in the hereinbefore-mentioned Patent No. 2,031,213, to establish communication from the chamber 106 in the self-lapping valve mechanism 40 of the load compensating valve device 9 to atmosphere via pipe and passage 107, pipe 238, the brake control valve device 230 and an exhaust pipe 243 connected to an exhaust port of the brake control valve device.

Upon the release of fluid under pressure from the chamber 106, the self-lapping valve mechanism 40 operates, in the manner hereinbefore explained, to release fluid under pressure from the chamber 233 in the brake cylinder device 231 to atmosphere. At the same time that fluid under pressure in chamber 233 is being released to atmosphere, as just explained, the fluid under pressure present in the chamber 232 is also being released to atmosphere via pipe 238, pipe T 239, valve device 230 and exhaust pipe 243. As fluid under pressure is thus simultaneously released from the chambers 232 and 233, the spring 242 is effective to move the piston 234 to the position in which it is shown in Fig. 5 to release the brakes.

*Initial charging of the equipment when a car is partially loaded or fully loaded*

When a partially-loaded or fully-loaded freight car provided with the equipment shown in Figs. 5 and 6 is coupled into a train and the brake pipe recharged, the brake control valve device 230 will operate, as described in Patent No. 2,031,213, and fluid under pressure will flow from the brake pipe to the chamber 119 in the locking portion 41 of the load compensating valve device 9 and the chamber 151 of the load measuring mechanism 10, as described in connection with the charging of an empty car.

As a car is loaded, the bolster 147 (Fig. 6) and load measuring mechanism 10 will be moved downward toward the truck spring plank 186 and away from the stop 236 a distance directly proportional to the load placed on the car. Therefore, the distance between the now upper end of piston member 152 (Fig. 1) and the stop 190 carried by the non-pressure head 145 at the time the head of the cap screw 184 contacts the stop 236 will decrease as the load on the car increases. Consequently, the pressure supplied from the chamber 151 in the load measuring mechanism 10 to the chamber 138 in the locking portion 41 of the load compensating valve device 9 before the disc valve 169 is moved into contact with its seat 170 will decrease as the load on the car increases.

As has been hereinbefore explained, when the locking portion 41 is operated to its unlocked position, the fluid under pressure present in the chamber 138 is supplied to the chamber 63 where it is effective to move the hollow sleeve member 92 in the direction of the right hand and effect an increase in the effective area of the diaphragm 101 to a degree proportional to the pressure built up in chamber 63. However, since the pressure built up in the chamber 63 decreases as the load is increased, as explained above, it is apparent that the effective area of the diaphragm 101 will be decreased as the load on the car is increased. Accordingly, the degree of fluid pressure supplied to the compensating chamber 233 in the brake cylinder device 231 by the self-lapping valve mechanism 40 for a given pressure supplied to the chamber 106, will decrease as the load on the car is increased.

From the above, it follows that during the initial charging of the equipment, the self-lapping valve mechanism 40 of the load compensating valve device 9 on a car is adjusted to provide, upon the operation thereof, a pressure in the compensating chamber 233 of the brake cylinder device 231 that varies inversely as the load on the car.

*Application of the brakes on a car that is partially loaded or fully loaded*

When an application of the brakes is made on a partially-loaded or fully-loaded car by effecting a reduction in brake pipe pressure, the operation of the brake control valve device 230 will be identical with the operation described for an empty car. From this it will be understood that fluid under pressure will be supplied through pipe 238 to the chamber 232 in the brake cylinder device 231 and through the pipe and passage 107 to the chamber 106 of the self-lapping valve mechanism 40 of the load compensating valve device 9. Since the self-lapping valve mechanism 40 has been adjusted so that its diaphragm 101 has an effective area inversely proportional to the load on the car, the valve mechanism will be operated by the pressure supplied to the chamber 106 to effect a build up of pressure in the compensating chamber 233 of the brake cylinder device 231 that is inversely proportional to the load. Therefore, the effective braking force on the car is in accordance with the load on the car since this force is dependent upon the difference in the pressures in the chambers 232 and 233 of the brake cylinder device 231.

*Release of the brakes on a partially-loaded or fully-loaded car*

When it is desired to effect a release of the brakes on a partially-loaded or fully-loaded car, the brake pipe pressure is increased in the usual manner. The brake control valve device 230 operates in response to this increase in brake pipe pressure to release fluid under pressure from the chamber 232 of the brake cylinder device 231 and the chamber 106 of the self-lapping valve mechanism 40 of the load compensating valve device 9. The self-lapping valve mechanism 40 then operates in response to the release of fluid under pressure from the chamber 106, in the manner hereinbefore described, to release fluid under pressure from the chamber 233 of the brake cylinder device 231 substantially simultaneously with the release of fluid under pressure from the chamber 232 in the brake cylinder device. Upon the simultaneous release of fluid under pressure from the chambers 232 and 233 of the brake cylinder device 231, the spring 242 will move the piston 234 to the position in which it is shown in Fig. 5 to effect a release of the brakes on the car.

Having now described the invention, what we claim as new and desire to secure by Letters Patent, is:

1. In a vehicle variable load fluid pressure brake equipment, the combination of a brake cylinder for effecting a brake application according to the pressure of fluid supplied thereto, a member having a paraboloidal surface thereon, a first diaphragm cooperatively contacting said paraboloidal surface and having its effective pressure area varied according to the area of said surface in contact with the diaphragm, a second diaphragm having a constant effective area, self-lapping valve means comprising a disc valve, an exhaust valve seat and a supply valve seat, said supply valve seat having an operative connection with said first and said second diaphragms and being operative in response to an operating pressure supplied to said first diaphragm to move away from said disc valve to effect the supply of a corresponding pressure to said brake cylinder and a balancing pressure to one side of said second diaphragm, the degree of said pressures being in accordance with the effective pressure area of said first diaphragm and variable accordingly as the effective area of said first diaphragm is varied, a third diaphragm having a constant effective area, said third diaphragm having an operative connection with said exhaust valve seat and being operative by fluid pressure, through the intermediary of said exhaust valve seat, to move said disc valve away from said supply valve seat to effect the supply of pressure to said second diaphragm to vary the area of said first diaphragm in contact with said paraboloidal surface to thereby vary the effective area of said first diaphragm, and means for establishing fluid pressure on said third diaphragm to a degree variable in accordance with the load carried by the vehicle.

2. In a vehicle variable load fluid pressure brake equipment, the combination of a brake cylinder for effecting a brake application according to the degree of pressure of fluid supplied thereto, a member having a paraboloidal surface thereon, valve means operative to supply fluid under pressure to said brake cylinder, a first diaphragm cooperatively contacting said paraboloidal surface and having its effective pressure area varied according to the area of said surface in contact with the diaphragm, said first diaphragm having an operative connection to said valve means and operatively responsive to an operating pressure supplied thereto to operate said valve means to effect the supply of a corresponding pressure to said brake cylinder, a second diaphragm having a constant effective area and an operative connection to said valve means, said second diaprhagm being operative at one time in response to fluid under pressure supplied to said brake cylinder by operation of said valve means to vary the area of said first diaphragm in cooperative contact with said paraboloidal surface to thereby vary the effective pressure area of said first diaphragm, and operative at another time in response to a reduction in the pressure acting on said first diaphragm to operate said valve means to effect a corresponding reduction in the pressure acting on said second diaphragm and in said brake cylinder until the opposing fluid pressure forces acting on said first and second diaphragms are balanced, a third diaphragm having a constant effective area and an operative connection to said valve means, said third diaphragm being operative by fluid pressure to operate said valve means, while fluid pressure acts on said first diaphragm to effect the supply of fluid under pressure to one side of said second diaphragm, and means for establishing fluid pressure on said third diaphragm to a degree variable in accordance with the load carried by the vehicle.

3. For use in a vehicle fluid pressure brake apparatus, a valve device for controlling the degree of fluid pressure supplied to effect a brake application, said valve device comprising a casing having a bore, a valve seat member having an annular valve seat thereon and movable in said bore, a disc valve movably carried by said valve seat member, resilient means for biasing said disc valve toward seating contact with said annular valve seat, a tubular valve element extending through said annular valve seat and having an annular exhaust valve seat on the end thereof adapted to contact said disc valve concentrically within said annular valve seat, two opposed fluid pressure responsive diaphragm means for controlling the movement of said valve seat member with respect to said disc valve, one of said diaphragms means being of a variable effective area and arranged to be subjected to a selected pressure established according to a desired degree of brake applying pressure, the other of said diaphragm means being of uniform effective area and subjected to the brake applying pressure supplied past said disc valve while unseated from said annular valve seat, and fluid pressure responsive means for moving said tubular element to contact and shift the position of said disc valve with respect to said annular valve seat member according to the pressure of fluid acting thereon.

4. For use in a vehicle fluid pressure brake apparatus, a valve device as claimed in claim 3, in which the variable effective area diaphragm means includes paraboloidal surface means formed on said casing and a flexible diaphragm clamped to said casing cooperating with said paraboloidal surface in such a manner as that the effective area of the diaphragm is varied according to the axial position of said valve seat member in said bore.

5. For use in a vehicle fluid pressure brake apparatus, a valve device as claimed in claim 3, further including means contactable with said tubular element for locking said tubular element in a given position, and fluid pressure controlled means for operating said locking means to release said tubular element for movement.

6. For use in a vehicle fluid pressure brake apparatus, a valve device as claimed in claim 5, further including means for controlling door operation on the vehicle and for concurrently controlling the supply of fluid under pressure to and the release of fluid under pressure from the last said fluid pressure controlled means to effect locking and unlocking of the tubular element by said locking means.

7. In a vehicle variable load fluid pressure brake equipment, the combination of a brake cylinder for effecting a brake application according to the pressure of fluid supplied thereto, a member having a paraboloidal surface thereon, a first diaphragm cooperatively contacting said paraboloidal surface and having its effective pressure area varied according to the area of said surface in contact with the diaphragm, a second diaphragm having a constant effective area, self-lapping valve means comprising a disc valve, an exhaust valve seat and a supply valve seat, said supply valve seat having an operative connection with said first and said second diaphragms and being operative in response to an operating pressure supplied to said first diaphragm to move away from said disc valve to effect the supply of a corresponding pressure to said brake cylinder and a balancing pressure to one side of said second diaphragm, the degree of said pressures being in accordance with the effective pressure area of said first diaphrgam and variable accordingly as the effective area of said first diaphragm is varied, a third diaphragm having a constant effective area, said third diaphragm having an operative connection with said exhaust valve seat and being operative by fluid pressure, through the intermediary of said exhaust valve seat, to move said disc valve away from said supply valve seat to effect the supply of pressure to said second diaphragm to vary the area of said first diaphragm in contact with said paraboloidal surface to thereby vary the effective area of said first diaphragm, a brake pipe normally charged with fluid under pressure, fluid pressure responsive control valve means operative in response to a reduction in the pressure in said brake pipe to effect the supply of said operating pressure to said first diaphragm, and fluid pressure responsive means operative in response to an increase of pressure in said brake pipe incidental to the charging of said brake pipe to a chosen pressure to supply a fluid pressure to said third diaphragm in accordance with the load on the vehicle.

8. In a variable load fluid pressure brake equipment for a vehicle having a sprung part, an unsprung part, and an air spring device disposed so as to support said sprung part on said unsprung part, the combination of a brake cylinder for effecting a brake application according to the pressure of fluid supplied thereto, a member having a paraboloidal surface thereon, a first diaphragm cooperatively contacting said paraboloidal surface and having its effective pressure area varied according to the area of said surface in contact with the diaphragm, a second diaphragm having a constant effective area, a third diaphragm having a constant effective area, self-lapping valve means comprising a disc valve, a supply valve seat and an exhaust valve seat, said supply valve seat having an operative connection with said first diaphragm and said second diaphragm, and said exhaust valve having an operative connection with said third diaphragm, said valve means being operative either in response to a first operating fluid pressure supplied to one side of said first diaphragm to effect the supply of a corresponding pressure to said brake cylinder and a balancing pressure to one side of said second diaphragm or, in response to a second operating fluid pressure supplied to one side of said third diaphragm, to effect, while said first operating fluid pressure acts on said first diaphragm, the supply of said first operating fluid pressure to said one side of said second diaphragm whereby said second diaphragm is deflected in a direction to, by reason of its connection to said first diaphragm through said valve means, decrease the area of said first diaphragm in cooperative contact with said paraboloidal surface to thereby vary the effective pressure area of said first diaphragm, a straight air pipe through which said first operating fluid pressure may be supplied to said one side of said first diaphragm, a manually operated brake valve device operative to supply said first operating fluid pressure to said straight air pipe, and leveling valve means connected between the sprung and unsprung parts of the vehicle and operative in response to an increase in the load on the sprung part to effect the supply of said second operating fluid pressure to the air spring device and to said one side of said third diaphragm in accordance with the load on the sprung part to operate said valve means.

9. In a variable load fluid pressure brake equipment for a vehicle having a sprung part and an unsprung part, the combination of a brake cylinder for effecting a brake application according to the pressure of fluid supplied thereto, a variable area diaphragm device comprising a member having a paraboloidal surface thereon and a first diaphragm cooperatively contacting said paraboloidal surface and having its effective pressure area varied according to the area of said surface in contact with the diaphragm, a second diaphragm having a constant effective area, self-lapping valve means comprising a disc valve, a supply valve seat and an exhaust valve seat, said supply valve seat having an operative connection with said variable area diaphragm device and with said second diaphragm and being operative in response to an operating pressure supplied to one side of said first diaphragm to move away from said disc valve to effect the supply of a corresponding pressure to said brake cylinder and a balancing pressure to one side of said second diaphragm, the degree of said pressures being in accordance with the effective pressure area of said first diaphragm and variable accordingly as the effective area of said first diaphragm is varied, a third diaphragm having a constant effective area and an operative connection with said exhaust valve seat, said third diaphragm being operative according to the degree of pressure acting thereon, through the intermediary of said exhaust valve seat, to move said disc valve away from said supply valve seat to effect the supply of pressure to said second diaphragm to vary the area of said surface in contact with said first diaphragm to thereby vary the effective area of said first diaphragm and consequently the pressure supplied to said brake cylinder upon movement of said supply valve seat away from said disc valve by said first diaphragm, a brake pipe normally charged with fluid under pressure, fluid pressure responsive control valve means operative in response to a reduction in the pressure in said brake pipe to effect the supply of said operating pressure to said variable area diaphragm device, and a fluid pressure operated strut cylinder device operative in response to an increase of pressure in the brake pipe incidental to charging of said brake pipe to a chosen pressure to supply a fluid pressure to said third diaphragm in accordance with the load on the vehicle.

10. In a variable load fluid pressure brake equipment for a vehicle having a sprung part and an unsprung part, the combination of a brake cylinder having a pressure chamber to which fluid under pressure may be supplied for effecting a brake application according to the pressure of fluid supplied thereto, a member having a paraboloidal surface thereon, a first diaphragm cooperatively contacting said paraboloidal surface and having its effective pressure area varied according to the area of said surface in contact with the diaphragm, a second diaphragm having a constant effective area, self-lapping valve means comprising a disc valve, a supply valve seat and an exhaust valve seat, said supply valve seat having an operative connection with said first and said second diaphragms and being operative in response to an operating fluid pressure supplied to one side of said first diaphragm to move away from said disc valve to effect the supply of a corresponding pressure to the pressure chamber of said brake cylinder and a balancing pressure to one side of said second diaphragm, a brake pipe normally charged with fluid under pressure, a fluid pressure responsive control valve device operative in response to a reduction in the pressure in said brake pipe to effect the supply of said operating fluid pressure to said first diaphragm to cause said first diaphragm to move said supply valve seat away from said disc valve, a third diaphragm having a constant effective area, said third diaphragm being operatively connected to said exhaust valve seat and operative by a fluid pressure, through the intermediary of said exhaust valve seat, to move said disc valve away from said supply valve seat to effect the supply of pressure to said second diaphragm to vary the area of said first diaphragm in cooperative contact with said paraboloidal surface to thereby vary the effective pressure area of said first diaphragm, and a fluid pressure operated load measuring strut cylinder device operative in response to an increase of pressure in said brake pipe incidental to charging of said brake pipe to a chosen pressure to supply a fluid pressure to said third diaphragm in accordance with the load on the vehicle, said strut cylinder device comprising two parts, one of which is a casing carried on the sprung part of the vehicle and having a bore therein, and the other of which is a piston slidably mounted in said bore and having a uniform stroke, said strut cylinder device further including a piston rod for said piston, said piston rod having two telescoping portions and resilient means for yieldably resisting inward telescopic movement of one of said portions with respect to the other, said one portion being shiftable into contact with a stop surface on said unsprung part of the vehicle, valve means carried by the piston, and fluid pressure responsive means carried by the piston and operable by fluid pressure supplied to the piston to operate said valve means to supply fluid pressure to said third diaphragm in accordance with the distance traveled by said piston subsequent to contact of said one portion of said piston rod with the said stop surface.

11. In a variable load fluid pressure brake equipment for a vehicle having an unsprung part and a sprung part, the combination of a compensating type brake cylinder having a casing provided with a bore and a differential area type piston slidably mounted in said bore and cooperating with said bore and casing to form a pressure chamber to one side of the piston and a compensating chamber to the opposite side of the piston, said brake cylinder being operable to effect a brake application according to the difference in the pressures in said chambers, a member having a paraboloidal surface thereon, a first diaphragm cooperatively contacting said paraboloidal surface and having its effective pressure area varied according to the area of said surface in contact with the diaphragm, a second diaphragm having a constant effective area, self-lapping valve means comprising a disc valve, a supply valve seat and an exhaust valve seat, said supply valve seat having an operative connection with said first and said second diaphragms and being operative in response to an operating pressure supplied to said first diaphragm to move away from said disc valve to effect the supply of a corresponding pressure to the compensating chamber of said brake cylinder and a balancing pressure to one side of said second diaphragm, a brake pipe normally charged with fluid under pressure, a fluid pressure responsive control valve device operative upon a reduction in the pressure in said brake pipe to effect the supply of said operating fluid pressure to the pressure chamber of said brake cylinder and to one side of said first diaphragm to cause said first diaphragm to move said supply valve seat away from said disc valve, a third diaphragm having a constant effective area, said third diaphragm being operatively connected to said exhaust valve seat and operative by fluid pressure on one side thereof, through the intermediary of said exhaust valve seat, to move said disc valve away from said supply valve seat to effect the supply of pressure to said second diaphragm to vary the area of said first diaphragm in cooperative contact with said paraboloidal surface to thereby vary the effective pressure area of said first diaphragm, and a fluid pressure operated strut cylinder device operative in response to an increase of pressure in said brake pipe incidental to charging of said brake pipe to a chosen pressure to supply a fluid pressure to said one side of said third diaphragm in accordance with the load on the vehicle.

12. In a variable load fluid pressure brake equipment for a vehicle having an unsprung part and a sprung part, the combination of a compensating type brake cylinder having a casing provided with a bore and a differential area type piston slidably mounted in said bore and cooperating with said bore and casing to form a pressure chamber to one side of the piston and a compensating chamber to the opposite side of the piston, said brake cylinder being operable to effect a brake application according to the difference in the pressures in said chambers, a member having a paraboloidal surface thereon, a first diaphragm cooperatively contacting said paraboloidal surface and having its effective pressure area varied according to the area of said surface in contact with the diaphragm, a second diaphragm having a constant effective area, self-lapping valve means comprising a disc valve, a supply valve seat and an exhaust valve seat, said supply valve seat having an operative connection with said first and said second diaphragms and being operative in response to an operating pressure supplied to said first diaphragm to move away from said disc valve to effect the supply of a corresponding pressure to the compensating chamber of said brake cylinder and a balancing pressure to one side of said second diaphragm, a brake pipe normally charged with fluid under pressure, a fluid pressure responsive direct release type control valve device operative upon a reduction in the pressure in said brake pipe to effect the supply of said operating fluid pressure to the pressure chamber of said brake cylinder and to one side of said first diaphragm to cause said first diaphragm to operate said valve means, a third diaphragm having a constant effective area, said third diaphragm being operatively connected to said exhaust valve seat and operative by fluid pressure on one side thereof to move said disc valve away from said supply valve seat to effect the supply of pressure to said second diaphragm to vary, through the intermediary of said exhaust valve seat, the area of said first diaphragm in cooperative contact with said paraboloidal surface to thereby vary the effective pressure area of said first diaphragm, a fluid pressure operated strut cylinder device operative in response to an increase of pressure in said brake pipe incidental to charging of said brake pipe to a chosen pressure to supply a fluid pressure to one side of said third diaphragm in accordance with the load on the vehicle, and a cut-off valve device for controlling the flow of fluid under pressure from said brake pipe to said strut cylinder device operable upon brake pipe pressure increasing to a chosen value to cut off flow of fluid under pressure from said brake pipe to said strut cylinder device and vent said strut cylinder device to atmosphere.

13. For use in a variable load brake equipment for a vehicle having a sprung part and an unsprung part, the combination of a brake cylinder, a brake pipe normally charged with fluid under pressure, a valve device for controlling the degree of fluid pressure supplied to effect a brake application, said valve device comprising a casing having a paraboloidal surface thereon and a bore extending therethrough, a hollow supply valve seat element having an annular valve seat thereon and movable in said bore, a tubular exhaust valve seat element extending through said hollow supply valve seat member and having an annular exhaust valve seat at one end thereof, a spring, a disc valve for controlling flow of fluid under pressure to and from said brake cylinder movable alternately into contact with the valve seat on either valve element by said spring, and out of contact with the valve seat on either valve element upon movement of the other valve element, two opposed fluid pressure responsive diaphragms operatively connected to said supply valve seat element, one of said diaphragms cooperatively contacting said paraboloidal surface and having its effective pressure area varied according to the area of said surface in contact with the diaphragm and operative in response to an operating pressure supplied thereto to increase the area of said variable area diaphragm in contact with said paraboloidal surface and to move the annular valve seat on said supply valve seat element in one direction relative to said exhaust valve seat element and away from said disc valve to effect seating of said disc valve on the annular valve seat on said exhaust valve seat element and the supply of fluid under pressure to said brake cylinder and a balancing pressure to one side of the other of said diaphragms, said other diaphragm being of a constant effective area, and operative by said balancing pressure to correspondingly decrease the area of said first diaphragm in cooperative contact with said parabolodial surface and to move the annular valve seat on said supply valve seat element in an opposite direction relative to said exhaust valve seat element toward said disc valve to lap said valve, a second spring, a third diaphragm having a constant effective area and being operatively connected to said second spring and to said exhaust valve seat element and operative by a fluid pressure to move said exhaust valve element in said opposite direction against the yielding resistance of said second spring a distance according to the degree of said fluid pressure, and fluid pressure operated locking means movable into and out of locking contact with said exhaust valve seat element for locking said element in a given position, fluid pressure operated load measuring means operative in response to an increase of pressure in said brake pipe incidental to charging of said brake pipe to a chosen pressure to supply a fluid pressure to said third diaphragm in accordance with the load carried by the sprung part of the vehicle, and a cut-off valve device for controlling the flow of fluid under pressure from said brake pipe to said locking means to effect operation thereof to unlock said locking means from said exhaust valve element and to said load measuring means to effect operation thereof, said cut-off valve device being operable upon brake pipe pressure increasing to a chosen value to cut off flow of fluid under pressure from said brake pipe to said locking means and to said load measuring means and then to vent to atmosphere fluid under pressure from said locking means to effect operation thereof to lock said exhaust valve element in a given position, and from said fluid pressure operated load measuring means to render said load measuring means inoperative.

14. A fluid pressure operated variable load control valve device for controlling the degree of fluid pressure supplied to effect a brake application according to variations of load on a vehicle, said valve device comprising a casing having a paraboloidal surface thereon and a bore extending therethrough, a hollow valve seat member having an annular valve seat thereon and movable in said bore, a disc valve movably carried by said valve seat member, resilient means for biasing said disc valve toward seating contact with said annular valve seat, a tubular valve element extending through said hollow valve seat member and having an annular exhaust valve seat on the end thereof adapted to contact said disc valve concentrically within said annular valve seat, two opposed fluid pressure responsive diaphragm means for controlling the movement of said valve seat member with respect to said disc valve, one of said diaphragm means being of a variable effective area and arranged to be subjected to a selected pressure established according to a desired degree of brake applying pressure, the other of said diaphragm means being of uniform effective area and subjected to the brake applying pressure supplied past said disc valve while unseated from said annular valve seat, a third fluid pressure responsive diaphragm means for moving said tubular element to contact and shift the position of said disc valve with respect to said annular valve seat member, and locking means for locking said tubular valve element in any position to which it may be moved by said fluid pressure responsive means.

15. A fluid pressure operated variable load control valve device for controlling the degree of fluid pressure supplied to effect a brake application according to variations of load on a vehicle, said valve device comprising a casing having a paraboloidal surface thereon and a bore extending therethrough, valve means operatively mounted in said bore, a first diaphragm operatively connected to said valve means and adapted to variously contact said paraboloidal surface to provide said diaphragm with a variable effective pressure area whereby said valve means is rendered operatively effective in response to fluid pressure supplied to act on said first diaphragm to supply a fluid pressure to a degree in accordance with the effective area of said diaphragm, and a second diaphragm having a constant effective area, said second diaphragm being operatively connected to said valve means and subject opposingly to the force of a spring and fluid pressure acting thereon to vary, through the intermediary of said valve means, the area of said first diaphragm in contact with said paraboloidal surface in accordance with the fluid pressure acting on said second diaphragm to thereby vary the effective pressure area of said first diaphragm and consequently the degree of fluid pressure supplied by said valve means.

16. A fluid pressure operated variable load control valve device for controlling the degree of fluid pressure supplied to effect a brake application according to variations of load on the vehicle, said valve device comprising a casing having a paraboloidal thereon and a bore extending therethrough connecting a first chamber in said casing to which fluid under pressure may be supplied and in which the pressure of fluid may be varied to effect the control of a device to be controlled and a second chamber in said casing from which the control device may receive fluid under pressure, valve means operative to control the supply of fluid under pressure from said first chamber to said second chamber and from said second chamber to atmosphere, a first diaphragm operatively connected to said valve means and adapted to have its effective pressure area varied by movement into and out of contact with said paraboloidal surface on said casing, said first diaphragm being responsive to fluid under pressure supplied to the first chamber to operate said valve means to supply fluid under pressure from the first chamber to the second chamber, a second diaphragm having a constant effective area, said second diaphragm being operatively connected to said valve means and responsive at one time to fluid under pressure supplied to the second chamber from the first chamber to vary the area of said first diaphragm in contact with said paraboloidal surface and at another time to a preponderance in the force on said second diaphragm exceeding the force on said first diaphragm to operate said valve means to release fluid under pressure from the second chamber to atmosphere until the pressure in the second chamber is reduced to the pressure in the first chamber, spring means, and a third diaphragm having a constant effective area, said third diaphragm being operatively connected to said valve means and said spring means and operative by a fluid pressure acting on one side thereof in a direction to oppose the yielding resistance of said spring means to vary, through the intermediary of either said valve means or said second diaphragm, according to the absence or the presence of a fluid pressure force acting on said first diaphragm, the area of said first diaphragm in contact with said paraboloidal surface in accordance with said last mentioned fluid pressure force acting on said third diaphragm to thereby vary the effective pressure area of said first diaphragm and consequently the degree of said first mentioned fluid pressure supplied by said valve means.

17. A fluid pressure operated variable load control valve device, comprising a casing on which is formed a paraboloidal surface and which has a bore extending therethrough connecting a first chamber in said casing to which fluid under pressure may be supplied and in which the pressure of fluid may be varied to effect the control of a device to be controlled and a second chamber in said casing from which the controlled device may receive fluid under pressure, a hollow supply valve seat element having an annular valve seat thereon and movable in said bore, a tubular exhaust valve seat element extending through said hollow supply valve seat element and having an annular exhaust valve seat at one end thereof, a spring, a disc valve for controlling flow of fluid under pressure to and from said brake cylinder movable into contact with the valve seat on either valve element by said spring, and out of contact with the valve seat on either valve element upon movement of the other valve element, two opposed fluid pressure responsive diaphragms operatively connected to said supply valve seat element, one of said diaphragms being adapted to have its effective area varied by movement into and out of contact with the paraboloidal surface on said casing and being responsive to fluid under pressure supplied to the first chamber to increase the area of said variable area diaphragm in contact with said paraboloidal surface and to move the supply valve seat element in one direction and out of contact with said disc valve to effect the supply of fluid under pressure from the first chamber to said brake cylinder and to said second chamber to establish a balancing pressure on the other of said diaphragms, said other diaphragm having a constant effective area, said other diaphragm being operative by said balancing pressure to correspondingly effect, through the intermediary of said supply valve seat element, a decrease in the area of said variable area diaphragm in contact with said parablodial surface until the opposing fluid pressure forces acting on said two opposing fluid pressure responsive diaphragms are balanced and the supply valve seat on said supply valve seat element is moved in an opposite direction into contact with said disc valve to lap said valve, a spring means, a third fluid pressure responsive diaphragm having a constant area, said third diaphragm being operatively connected to said spring means and to said exhaust valve seat element and operative by a fluid pressure acting on one side thereof in a direction to oppose the yielding resistance of said spring means to move said exhaust valve element in said opposite direction against the yielding resistance of said spring means a distance variable in accordance with the degree of said fluid pressure, and fluid pressure responsive locking means movable into and out of locking contact with said exhaust valve seat element for locking said element in a given position.

18. A fluid pressure operated load measuring mechanism for a variable load brake equipment of a railway vehicle having an unsprung part and a load-carrying sprung part, said mechanism comprising a casing carried on the sprung part of the vehicle and having a bore, a piston slidably mounted in the bore and having a uniform stroke, a piston rod for said piston, said piston rod having two telescoping portions and resilient means for yieldably resisting inward telescopic movement of one of said portions with respect to the other, said one portion of the piston rod being shifted into contact with a stop surface on said unsprung part of the vehicle when fluid under pressure is supplied to a first chamber at one side of said piston to cause the uniform stroke of said piston, said resilient means being compressed a varying amount dependent on the telescoping movement of said one part of the piston rod relative to the other part of the piston rod after said one part of the piston rod contacts the stop surface on the unsprung part of the vehicle, a passageway through said piston connecting said first chamber to a second chamber on the opposite side of the piston, valve means carried on the piston for controlling the supply of fluid under pressure from said first chamber to said second chamber via said passageway, said valve means comprising a valve shifted to an unseated position opening said passageway by the force of the said resilient means, and fluid pressure responsive means carried by the piston and subject to the fluid pressure developed in said second chamber for relieving said valve of the force of said resilient means thereby causing the valve means to reseat and close said passageway, said valve means thereby delivering a fluid pressure corresponding to the degree of compression of the resilient means which in turn reflects the degree of load carried by the vehicle.

19. A fluid pressure operated load measuring mechanism for a variable load brake equipment of a railway vehicle having an unsprung part and a load carrying sprung part, said mechanism comprising a casing carried on the sprung part of the vehicle and having two passageways each of which opens into a bore formed in the casing, a piston of uniform stroke slidably mounted in the bore in said casing, a piston rod for said piston, said piston rod having two telescoping portions and resilient means for yieldably resisting inward telescopic movement of one of said portions with respect to the other, said one portion being shiftable by said piston into contact with a stop surface on said unsprung part of the vehicle when fluid under pressure is supplied through one of said two passageways to a first chamber at one side of said piston to cause the uniform stroke of said piston, said resilient means being compressed a varying amount dependent on the telescopic movement of said one part of said piston rod relative to the other part after said one part contacts said stop surface, a passageway through said piston connecting said first chamber to a second chamber on the opposite side of said piston and always open to said second passageway, notwithstanding the position of said piston, valve means carried on said piston for controlling the supply of fluid under pressure from said first chamber to said second chamber via the passageway in said piston, said valve means comprising a valve shifted by the force of said resilient means to an unseated position to open said passageway in said piston, fluid pressure responsive means carried by the piston and subject to the fluid pressure developed in said second chamber and second passageway for relieving said valve of the force of said resilient means, and spring means for shifting said valve to a seated position to close communication between said two passageways in said casing through said passageway in said piston, said valve means thereby delivering a fluid pressure to said second passageway in said casing corresponding to the degree of compression of said resilient means which in turn reflects the degree of load carried by the vehicle.

20. A measuring mechanism for a load compensating brake equipment for a railway vehicle having an unsprung part on which is mounted a first stop and a load carrying sprung part, said mechanism comprising a casing having a bore and being mounted on the sprung part, a piston slidably mounted in said bore and cooperating with said casing to form a pressure chamber at one side of said piston and a non-pressure chamber at the other side of said piston, a non-pressure head secured to said casing and having mounted therein a second stop, a return spring disposed between said piston and said non-pressure head to bias said piston in the direction of the pressure chamber, a piston rod for said piston, resilient means connecting said piston rod with said piston, said piston rod being movable relative to said casing by said piston into contact with said first stop, said resilient means providing for continued movement of said piston into contact with said second stop to correspondingly increase the degree of compression of said resilient means in proportion to the degree of movement of said piston subsequent to said piston rod contacting said first stop, a diaphragm carried by said piston and having at one side thereof a first chamber and at the opposite side thereof a second chamber, said second chamber being always open to atmosphere, and normally unseated valve means carried by said piston and past which fluid pressure flows from said pressure chamber to said first chamber, said valve being opposingly subject to the force of said resilient means and the fluid pressure acting in said first chamber on said diaphragm to effect seating of said valve means when the fluid pressure acting on said diaphragm in said first chamber corresponds to the force exerted by said resilient means, the fluid pressure established in said first chamber thereby serving as a measure of the load carried by the vehicle.

References Cited in the file of this patent

UNITED STATES PATENTS

| 1,793,573 | Whitaker | Feb. 24, 1931 |
| 2,390,049 | Baldwin | Dec. 4, 1945 |
| 2,450,464 | Bent | Oct. 5, 1948 |
| 2,715,050 | Sexton | Aug. 9, 1955 |
| 2,721,768 | Cook | Oct. 25, 1955 |